United States Patent
Islam et al.

(10) Patent No.: US 11,051,208 B2
(45) Date of Patent: Jun. 29, 2021

(54) CO-EXISTENCE OF LOW LATENCY AND LATENCY TOLERANT DOWNLINK COMMUNICATION

(71) Applicant: Huawei Technologies Co., Ltd., Shenzhen (CN)

(72) Inventors: Toufiqul Islam, Ottawa (CA); Mohammadhadi Baligh, Ottawa (CA); Kelvin Kar Kin Au, Kanata (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/675,432

(22) Filed: Aug. 11, 2017

(65) Prior Publication Data

US 2018/0063749 A1    Mar. 1, 2018

Related U.S. Application Data

(60) Provisional application No. 62/379,559, filed on Aug. 25, 2016.

(51) Int. Cl.
*H04W 28/18* (2009.01)
*H04B 7/26* (2006.01)
(Continued)

(52) U.S. Cl.
CPC .......... *H04W 28/18* (2013.01); *H04B 7/2656* (2013.01); *H04L 1/0047* (2013.01);
(Continued)

(58) Field of Classification Search
CPC ..... H04L 5/0053; H04L 5/005; H04L 5/0044; H04L 5/0094; H04L 1/0047;
(Continued)

(56) References Cited

U.S. PATENT DOCUMENTS 10,334,589 B2 * 6/2019 Stephenne ........ H04W 72/1242
10,368,345 B2   7/2019 Sun et al.
(Continued)

FOREIGN PATENT DOCUMENTS

CN    101212762 A    7/2008
CN    101459965 A    6/2009
(Continued)

OTHER PUBLICATIONS

Qualcomm Incorporated, "Numerology and TTI multiplexing for NR Forward Compatibility Analysis", 3GPP TSG-RAN WG1 #85, R1-164692, May 23-27, 2016, 8 pages, Nanjing, China.
(Continued)

*Primary Examiner* — Melanie Jagannathan
(74) *Attorney, Agent, or Firm* — Slater Matsil, LLP

(57) ABSTRACT

Resources used for downlink communication may be partitioned by the base station so that a portion of the resources is reserved for the downlink transmission of low latency data. However, low latency data may be bursty or sporadic in nature, and may be transmitted in short packets. Therefore, there may not always be low latency data at the base station that needs to be transmitted using all of the low latency resources. System and methods are therefore disclosed in which the base station opportunistically schedules, on the low latency resources, latency tolerant data for one or more latency tolerant UEs. When latency tolerant data is scheduled on the low latency resources, signaling is used to indicate if the latency tolerant transmission on the low latency resources is modified.

18 Claims, 10 Drawing Sheets

(51) Int. Cl.
  *H04L 1/18* (2006.01)
  *H04W 28/06* (2009.01)
  *H04W 72/04* (2009.01)
  *H04L 1/00* (2006.01)
  *H04L 5/00* (2006.01)
  *H04W 72/12* (2009.01)

(52) U.S. Cl.
  CPC .......... *H04L 1/0068* (2013.01); *H04L 1/0075* (2013.01); *H04L 1/1812* (2013.01); *H04L 1/1893* (2013.01); *H04L 5/0044* (2013.01); *H04L 5/0053* (2013.01); *H04L 5/0094* (2013.01); *H04W 28/06* (2013.01); *H04W 72/042* (2013.01); *H04W 72/1226* (2013.01); *H04W 72/1289* (2013.01)

(58) Field of Classification Search
  CPC ... H04L 1/0068; H04L 1/0075; H04L 1/1812; H04L 1/1893; H04W 72/0446; H04W 28/06; H04W 28/08; H04W 28/18; H04J 11/005; H04J 5/005; H04J 5/0053; H04J 72/0446; H04B 7/2656
  See application file for complete search history.

(56) References Cited

U.S. PATENT DOCUMENTS

| | | | |
|---|---|---|---|
| 2004/0062273 A1 | 4/2004 | Frank et al. | |
| 2005/0071471 A1 | 3/2005 | Saenz, III | |
| 2008/0313521 A1 | 12/2008 | Frederiksen et al. | |
| 2010/0074200 A1 | 3/2010 | Li et al. | |
| 2012/0329400 A1* | 12/2012 | Seo | H04J 11/005 455/63.1 |
| 2013/0083753 A1 | 4/2013 | Lee et al. | |
| 2013/0163537 A1* | 6/2013 | Anderson | H04W 72/1284 370/329 |
| 2013/0324117 A1 | 12/2013 | Kim et al. | |
| 2014/0086197 A1* | 3/2014 | Yang | H04B 7/2656 370/329 |
| 2014/0146689 A1 | 5/2014 | Gaur et al. | |
| 2014/0258815 A1* | 9/2014 | Jeong | H03M 13/152 714/782 |
| 2014/0325321 A1* | 10/2014 | Rafique | H03M 13/6362 714/790 |
| 2014/0369247 A1* | 12/2014 | Sambhwani | H04W 76/28 370/311 |
| 2015/0023145 A1* | 1/2015 | Kim | H04W 72/042 370/201 |
| 2015/0181570 A1* | 6/2015 | Sorrentino | H04W 72/1205 370/329 |
| 2015/0230211 A1 | 8/2015 | You et al. | |
| 2015/0256486 A1* | 9/2015 | Boucard | H04L 45/245 370/392 |
| 2015/0326369 A1 | 11/2015 | Kim et al. | |
| 2015/0334685 A1 | 11/2015 | Ji et al. | |
| 2015/0334709 A1* | 11/2015 | Ji | H04W 72/0453 370/330 |
| 2016/0057768 A1 | 2/2016 | Sun et al. | |
| 2016/0066316 A1 | 3/2016 | Bhushan et al. | |
| 2016/0127094 A1 | 5/2016 | Jiang et al. | |
| 2016/0128045 A1* | 5/2016 | Azarian Yazdi | H04L 5/0053 370/330 |
| 2016/0198350 A1 | 7/2016 | Lou et al. | |
| 2016/0234857 A1 | 8/2016 | Chen et al. | |
| 2016/0309466 A1* | 10/2016 | Chen | H04B 7/2628 |
| 2016/0309518 A1* | 10/2016 | Patel | H04W 74/0891 |
| 2016/0352551 A1 | 12/2016 | Zhang et al. | |
| 2016/0381490 A1* | 12/2016 | Rico Alvarino | H04W 4/70 370/330 |
| 2017/0111886 A1 | 4/2017 | Kim et al. | |
| 2017/0257860 A1 | 9/2017 | Nam et al. | |
| 2017/0289964 A1* | 10/2017 | Lin | H04L 5/0094 |
| 2017/0332358 A1 | 11/2017 | Park et al. | |
| 2017/0366311 A1 | 12/2017 | Iyer et al. | |
| 2017/0367003 A1 | 12/2017 | Zhang et al. | |
| 2018/0041858 A1 | 2/2018 | Sheng et al. | |
| 2018/0049166 A1 | 2/2018 | Sun et al. | |
| 2018/0049189 A1 | 2/2018 | Hugl et al. | |
| 2018/0049197 A1 | 2/2018 | Patel et al. | |
| 2018/0049272 A1 | 2/2018 | Bagheri et al. | |
| 2018/0199341 A1 | 7/2018 | Baldemair et al. | |
| 2018/0234998 A1 | 8/2018 | You et al. | |
| 2018/0249486 A1* | 8/2018 | Hosseini | H04W 72/1289 |
| 2018/0255543 A1 | 9/2018 | Takeda et al. | |
| 2018/0279347 A1 | 9/2018 | Wang et al. | |
| 2018/0287739 A1* | 10/2018 | Kim | H04L 27/2602 |
| 2018/0302900 A1* | 10/2018 | Ibars Casas | H04L 5/0053 |
| 2018/0337763 A1 | 11/2018 | Shi et al. | |
| 2018/0367263 A1* | 12/2018 | Ying | H04W 72/1273 |
| 2018/0376495 A1 | 12/2018 | Lee et al. | |
| 2019/0007181 A1 | 1/2019 | Marinier et al. | |
| 2019/0115997 A1* | 4/2019 | Chen | H04L 1/00 |
| 2019/0165906 A1 | 5/2019 | Bala et al. | |
| 2019/0173623 A1 | 6/2019 | Khosravirad et al. | |
| 2019/0190675 A1* | 6/2019 | Takeda | H04W 72/0446 |
| 2019/0223050 A1 | 7/2019 | Wikström et al. | |
| 2019/0261383 A1 | 8/2019 | Kwak et al. | |
| 2019/0268096 A1* | 8/2019 | Takeda | H04L 1/0068 |
| 2019/0268107 A1* | 8/2019 | Yasukawa | H04L 1/1861 |
| 2019/0319750 A1* | 10/2019 | Khosravirad | H04L 1/0061 |
| 2019/0372742 A1 | 12/2019 | Lee et al. | |
| 2020/0015248 A1 | 1/2020 | Ji et al. | |
| 2020/0037305 A1* | 1/2020 | Yang | H04W 72/042 |

FOREIGN PATENT DOCUMENTS

| | | |
|---|---|---|
| CN | 101986619 A | 3/2011 |
| CN | 104113937 A | 10/2014 |
| CN | 104284424 A | 1/2015 |
| EP | 2214340 A1 | 8/2010 |
| JP | 2014107868 A | 6/2014 |
| JP | 2017519421 A | 7/2017 |
| JP | 2017530653 A | 10/2017 |
| WO | 2008154646 A2 | 12/2008 |
| WO | 2010012156 A1 | 2/2010 |
| WO | 2015003057 A3 | 3/2015 |
| WO | 2015179136 A1 | 11/2015 |
| WO | 2015179145 A1 | 11/2015 |
| WO | 2016036492 A1 | 3/2016 |
| WO | 2016040290 A1 | 3/2016 |
| WO | 2016126398 A1 | 8/2016 |

OTHER PUBLICATIONS

Qualcomm Incorporated "Frame structure requirements", 3GPP TSG-RAN WG1 #85, R1-164694, May 23-27, 2016, 5 pages, Nanjing, China.
Nokia, Alcatel-Lucent Shanghai Bell, "Punctured Scheduling for Low Latency Transmissions", 3GPP TSG-RAN WG1 #85, R1-165381, May 23-27, 2016, 4 pages, Nanjing, China.
Qualcomm et al., "WF on Scalable Numerology Symbol Boundary Alignment", 3GPP TSG RAN WG1 #85, R1-165583, May 23-27, 2016, 6 Pages, XP511117744, Nanjing, China.
Samsung, "Discussion on symbol alignment across scaled numerology", 3GPP TSG RAN WG1#86, R1-166753, Aug. 22-26, 2016, 4 Pages, XP51141919, Gothenburg, Sweden.
LG Electronics, "Discussion on alignment for different numerology multiplexing", 3GPP TSG RAN WG1 Meeting #136, R1-166878, Aug. 22-26, 2016, 5 Pages, XP51125615, Gothenburg, Sweden.
LG Electronics, "Discussion on relay operation in NR", 3GPP TSG RAN WG1 Meeting #86, R1-166887, Aug. 22-26, 2016, 4 Pages, XP51132944, Gothenburg, Sweden.
Nokia et al., "Punctured Scheduling for Low Latency Transmissions", 3GPP TSG-RAN WG1 #86, R1-167308, Aug. 22-26, 2016, 4 Pages, XP51125827A, Gothenburg, Sweden.
Samsung, "Discussion on URLLC support in NR," 3GPP TSG RAN WG1 Meeting #86, R1-166759, Aug. 22-26, 2016, 5 Pages, Gothenburg, Sweden.

(56) References Cited

OTHER PUBLICATIONS

Caban, S., et al., "Evaluation of HSDPA and LTE, From Testbed Measurements to System Level Performance", Wiley, A John Wiley & Sons, Ltd. Publication, Jan. 1, 2012, 4 Pages.
Rumney, M., "LTE and the Evolution to 4G Wireless, Design and Measurement Challenges", Second Edition, Wiley, Agilent Technologies, Jan. 2013, 4 Pages.
ZTE et al., "Unified Synchronization Structure", 3GPP TSG RAN WG1 Meeting #86, R1-166422, Aug. 22-26, 2016, 6 Pages, Gothenburg, Sweden.
Huawei et al., "Consideration on multiplexing of non-sTTI and sTTI in the same carrier", 3GPP TSG RAN WG1 Meeting #84bis, R1-162590, Apr. 11-15, 2016 5 Pages, Busan, Korea.
Huawei et al., "Discussion on sTTI scheduling", 3GPP TSG RAN WG1 Meeting #88, R1-1701733, Feb. 13-17, 2017, 9 Pages, Athens Greece.
Intel Corporation, "Downlink URLLC transmission on multiplexing with eMBB", 3GPP TSG RAN WG1 Meeting 187, R1-1612003, Nov. 14-18, 2016, 10 Pages, Reno, USA.
Samsung, "Collision handling of sTTI and TTI in UL", 3GPP TSG RAN WG1 Meeting #89, R1-1707886, May 15-19, 2017, 4 Pages, Hangzhou, P.R. China.
Huawei, et al., "On pre-emption indication for DL multiplexing of URLLC and eMBB", 3GPP TSG RAN WG1 Meeting 188bis, R1-1704215, Apr. 3-7, 2017, 5 Pages, Spokane, USA.

\* cited by examiner

CO-EXISTENCE OF LOW LATENCY AND LATENCY TOLERANT DOWNLINK COMMUNICATION

PRIORITY

The present application claims priority to U.S. Provisional Patent Application Ser. No. 62/379,559, entitled "Co-existence of Low Latency and Latency Tolerant Downlink Communication", which was filed on Aug. 25, 2016, and which is incorporated herein by reference in its entirety.

FIELD

The present application relates to wireless communications, and more particularly to the co-existence of low latency and latency tolerant downlink communication.

BACKGROUND

In some wireless communication systems, user equipments (UEs) wirelessly communicate with one or more base stations. A wireless communication from a UE to a base station is referred to as an uplink communication. A wireless communication from a base station to a UE is referred to as a downlink communication. Resources are required to perform uplink and downlink communications. For example, a base station may wirelessly transmit data to a UE in a downlink communication at a particular frequency for a particular duration of time. The frequency and time duration are examples of resources.

A base station allocates resources for downlink communications to the UEs served by the base station. The wireless communications may be performed by transmitting orthogonal frequency-division multiplexing (OFDM) symbols.

Some UEs served by a base station may need to receive data from the base station with lower latency than other UEs served by the base station. For example, a base station may serve multiple UEs, including a first UE and a second UE. The first UE may be a mobile device carried by a human who is using the first UE to browse on the Internet. The second UE may be equipment on an autonomous vehicle driving on a highway. Although the base station is serving both UEs, the second UE may need to receive data with lower latency compared to the first UE. The second UE may also need to receive its data with higher reliability than the first UE. The second UE may be an ultra-reliable low latency communication (URLLC) UE, whereas the first UE may be an enhanced mobile broadband (eMBB) UE.

UEs that are served by a base station and that require lower latency downlink communication will be referred to as "low latency UEs". The other UEs served by the base station will be referred to as a "latency tolerant UEs". Data to be transmitted from the base station to a low latency UE will be referred to as "low latency data", and data to be transmitted from the base station to a latency tolerant UE will be referred to as "latency tolerant data". A single UE may use both low latency communication and latency tolerant communication, in which case the term "low latency UE" would refer to the activities of the single UE for the purpose of low latency communication, and the term "latency tolerant UE" would refer to the activities of the single UE for the purpose of latency tolerant communication.

It is desired to have a base station and frame structure that can accommodate the use of the same time-frequency resources by both low latency UEs and latency tolerant UEs.

SUMMARY

Resources used downlink communication may be partitioned by the base station so that a portion of the resources is reserved for the downlink transmission of low latency data. The resources that are reserved for the downlink transmission of low latency data will be referred to as "low latency resources".

However, low latency data may be bursty or sporadic in nature, and may be transmitted in short packets, and so there may not always be low latency data at the base station that needs to be transmitted using all of the low latency resources. System and methods are therefore disclosed in which the base station opportunistically schedules, on the low latency resources, latency tolerant data for one or more latency tolerant UEs. When latency tolerant data is scheduled on the low latency resources, signaling is used to indicate if the latency tolerant transmission on the low latency resources is modified.

As one example, if during the transmission of the latency tolerant data on the low latency resources, some low latency data arrives at the base station for downlink transmission, then the base station puncture some or all of the remainder of the latency tolerant transmission on the low latency resources. The low latency resources freed by puncturing the latency tolerant transmission may then be used by the base station to transmit the newly arrived low latency data. Signaling in a subframe transmitted using the low latency resources informs the latency tolerant UE where the latency tolerant transmission has been punctured. The signaling in one subframe can additionally or alternatively inform the latency tolerant UE of puncturing in one or more other subframes.

In one embodiment, a method performed by a base station is disclosed. The method includes transmitting data for a UE using resources, modifying the transmission of the data during the transmission of the data, and transmitting signaling that indicates that the transmission of the data has been modified.

In another embodiment, a method performed by a UE is disclosed. The method includes receiving data from a base station, and concurrently with receiving the data, receiving signaling that indicates that transmission of the data has been modified by the base station.

In another embodiment, a method performed by a UE is disclosed. The method includes receiving a downlink transmission, from a base station, in downlink resources. The method may further include receiving signaling. The signaling may also be sent to at least one other UE. The signaling may indicate that data on a portion of the downlink resources has been punctured. The UE may modify decoding of the downlink transmission based on the signaling.

In another embodiment, a method for wireless communication is disclosed. The method includes transmitting, to a first UE, a scheduled first downlink transmission in first downlink resources. The method may further include transmitting, to a second UE, a scheduled second downlink transmission in the first downlink resources. The method may further include transmitting, to a third UE, a scheduled third downlink transmission in second downlink resources different from the first downlink resources. The method may further include transmitting a common signaling to the first UE and to the second UE, but not to the third UE. The common signaling may indicate that a portion of at least one of the first downlink transmission and the second downlink transmission has been punctured. The method may further include transmitting, to a fourth UE, a fourth downlink transmission in the portion of the at least one of the first downlink transmission and the second downlink transmission that has been punctured.

BRIEF DESCRIPTION OF THE DRAWINGS

Embodiments will be described, by way of example only, with reference to the accompanying figures wherein.

DETAILED DESCRIPTION

For illustrative purposes, specific example embodiments will now be explained in greater detail below in conjunction with the figures.

Figure 1:
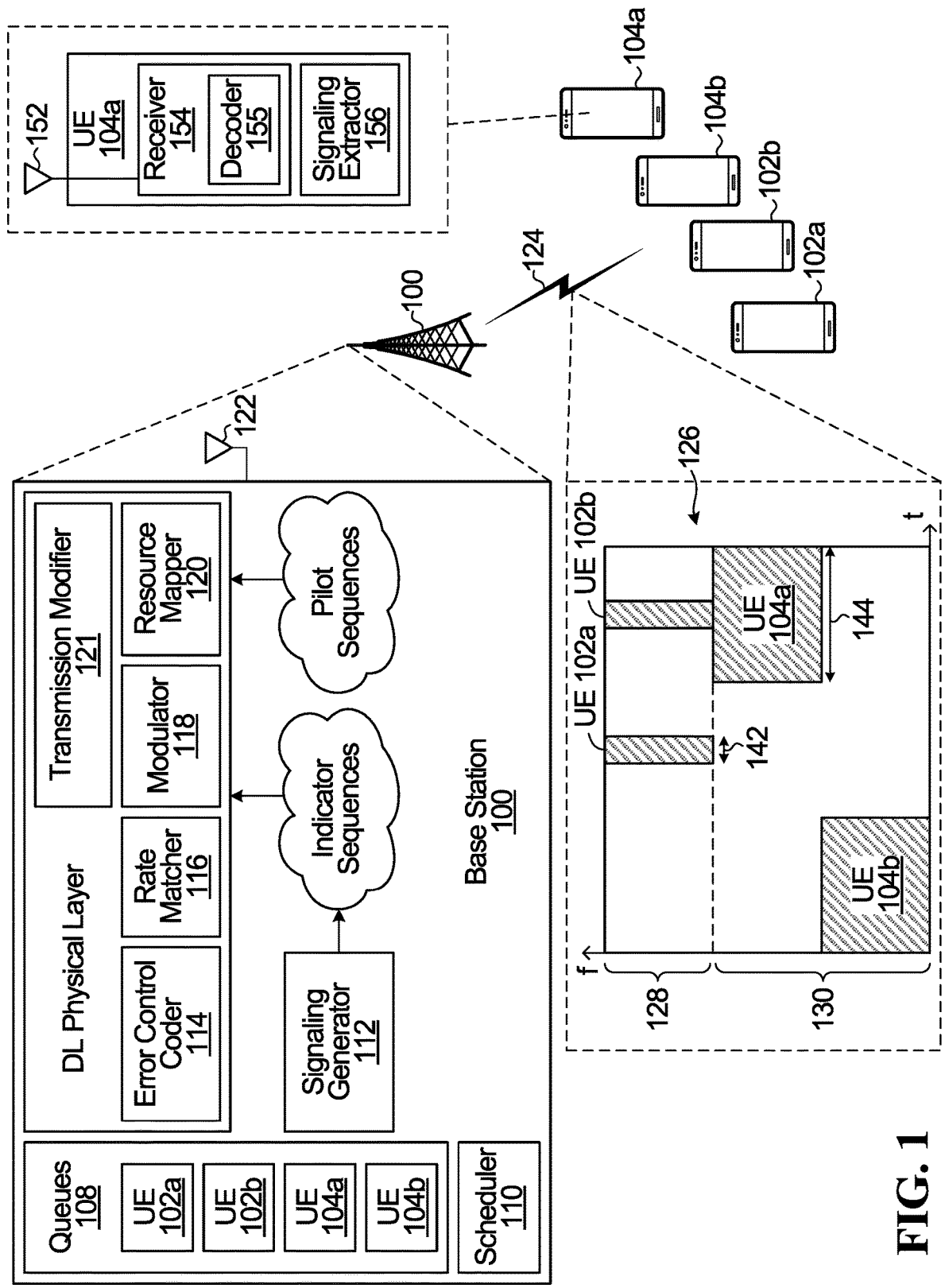
FIG. 1 is a block diagram of a base station and four UEs, according to one embodiment.

FIG. 1 is a block diagram of a base station 100, as well as four UEs 102a, 102b, 104a, and 104b served by the base station 100, according to one embodiment. UEs 102a and 102b are low latency UEs, and UEs 104a and 104b are latency tolerant UEs. That is, UEs 102a and 102b require lower latency downlink communication compared to UEs 104a and 104b. For example, UEs 102a and 102b may be URLLC UEs, and UEs 104a and 104b may be eMBB UEs. Although the base station 100 only serves four UEs in FIG. 1, in actual operation the base station 100 may serve many more UEs. It is also contemplated that a single UE 102, 104 might be served by more than one base station 100. Downlink transmissions to the latency tolerant UEs are typically grant-based, but may be grant-free. Also, downlink transmissions to the low latency UEs may be grant-based or grant-free. Base station 100 may alternatively represent a group of base stations, belonging to same or different cell, with same or different carrier frequencies. Transmission can be made either in licensed or unlicensed spectrum, frequency division duplex or time division duplex or unified duplex frame.

The base station 100 includes queues 108 for storing data to be sent to UEs served by the base station 100. The queues 108 may be implemented by memory, e.g., physical registers. The base station 100 further includes a scheduler 110 for scheduling UEs on available resources. The base station 100 further includes processing blocks for implementing the downlink physical layer, such as an error control coder 114, a rate matcher 116, a modulator 118, and a resource mapper 120. The downlink physical layer of the base station 100 further includes a transmission modifier 121 for modifying a latency tolerant data transmission being sent on the low latency resources. The downlink physical layer of the base station 100 may include other processing blocks, but these have been omitted for the sake of clarity.

The base station 100 further includes signaling generator 112 for generating signaling, such as one or more indicator sequences, that provide the indications described later.

The input to the downlink physical layer includes data from the queues 108, as well as pilot sequences and the indicator sequences, all of which are ultimately mapped to resources using the resource mapper 120.

The scheduler 110, signaling generator 112, error control coder 114, rate matcher 116, modulator 118, resource mapper 120, and transmission modifier 121 may each be implemented by a processor that executes instructions that cause the processor to perform the operations of the scheduler 110, signaling generator 112, error control coder 114, rate matcher 116, modulator 118, resource mapper 120, and transmission modifier 121. The same or different processor may be used to implement each of the scheduler 110, signaling generator 112, error control coder 114, rate matcher 116, modulator 118, resource mapper 120, and transmission modifier 121. Alternatively, the scheduler 110, signaling generator 112, error control coder 114, rate matcher 116, modulator 118, resource mapper 120, and/or transmission modifier 121 may be implemented using dedicated integrated circuitry, such as an application specific integrated circuit (ASIC), a graphics processing unit (GPU), or a programmed field programmable gate array (FPGA) for performing the functions of the scheduler 110, signaling generator error control coder 114, rate matcher 116, modulator 118, resource mapper 120, and/or transmission modifier 121.

The base station 100 further includes one or more antennas 122 to wirelessly transmit signals carrying data for UEs 102a, 102b, 104a, and 104b. Only one antenna 122 is illustrated. The one or more antennas 122, as well as some or all of the processing blocks of the downlink physical layer, may form a transmitter. The base station 100 may include other circuitry and/or modules for performing other functions, e.g. a receiver for receiving uplink transmissions, but these have been omitted for the sake of clarity.

The word "base station" encompasses any device that wirelessly transmits data in the downlink to UEs. Therefore, in some implementations, the base station 100 may be called other names, such as a base transceiver station, a radio base station, a network node, an access point, a transmit node, a NodeB, an evolved Node B ("eNodeB"), a relay station, a remote radio head, a transmit point, or a transmit and receive point. Also, in some embodiments, the functions of the base station 100 may be distributed. For example, some of the modules or processing blocks of the base station 100 (e.g. the scheduler 110, the signaling generator 112, and/or the transmission modifier 121) may be located remote from the equipment housing the one or more antennas 122 of the base station 100, and may be coupled to the equipment housing the antennas 122 over a communication link (not shown). Therefore, in some embodiments, the term base station 100 may also refer to modules or processing blocks on the network side that perform processing operations, such as scheduling and message generation, and that are not necessarily part of the equipment housing the antennas 122 of the base station 100. The modules or processing blocks may also be coupled to other base stations. In some embodiments, the base station 100 may actually be a plurality of base stations that are operating together to serve the UEs 102a-b and 104a-b, e.g. through coordinated multipoint transmissions.

When the base station 100 has data to transmit to UEs 102a, 102b, 104a, and/or 104b, the base station 100 transmits this data in one or more downlink transmissions 124 using allocated resources, for example time-frequency resources. An example of time-frequency resources is indicated at 126. Example specific resource partitions are shown as being assigned for transmissions to UEs 102a, 102b, 104a, and 104b.

A portion 128 or region of the time-frequency resources 126 is reserved or used for the downlink transmission of low latency data, and this portion 128 will be referred to as the low latency resources. The time-frequency region 128 reserved or used for transmission for low latency data may also be used for the transmission of latency tolerant data, as described below. The other portion 130 or region of the time-frequency resources 126 is not used for downlink transmission of low latency data, and this portion 130 will be referred to as the latency tolerant resources. The low latency resources 128 are illustrated as a separate frequency range from the latency tolerant resources 130, although the low latency resources 128 and the latency tolerant resources 130 may alternatively be in the same frequency range. Also, the portion of resources reserved as low latency resources 128 may change dynamically or semi-statically over time, e.g. based on factors such as traffic load, bandwidth requirements, and latency.

The low latency resources 128 may be partitioned into subframes. A subframe of the low latency resources will be referred to as a "low latency subframe". An example of a low latency subframe duration is shown at 142. A low latency subframe duration may be equal to one transmission time unit (TTU), or encompass multiple TTUs, depending on the embodiment. A TTU is the smallest unit of time that can be allocated for a particular type of transmission, for example a low latency data transmission. Therefore, although "low latency subframe" is used herein, it may be interchangeably called a "low latency TTU" in embodiments in which a subframe has the same duration as a TTU. Also, a TTU is sometimes referred to as a transmission time interval (TTI).

The latency tolerant resources 130 may be partitioned into scheduling intervals, and a scheduling interval of the latency tolerant resources 130 will be referred to as a "latency tolerant UE scheduling interval". An example of a latency tolerant UE scheduling interval is shown at 144. A latency tolerant UE scheduling interval is the smallest interval of time that may be scheduled for a data transmission to a latency tolerant UE.

A low latency subframe has a duration that is shorter than a latency tolerant UE scheduling interval. By transmitting subframes of a shorter duration in the low latency resources 128, the latency of the data transmissions to the low latency UEs may be reduced. A low latency subframe may have x number of symbols or slots, x≥1 and integer.

In some embodiments, the low latency resources 128 have a numerology that is different from the numerology of the latency tolerant resources 130, e.g. the subcarrier spacing of the low latency resources 128 is different from the subcarrier spacing of the latency tolerant resources 130. The low latency resources 128 may have a subcarrier spacing that is larger than the subcarrier spacing of the latency tolerant resources 130. For example, the subcarrier spacing of the low latency resources 128 may be 60 kHz, and the subcarrier spacing of the latency tolerant resources 130 may be 15 kHz. By using a larger subcarrier spacing, the duration of each OFDM symbol in the low latency resources 128 will be shorter than the duration of each OFDM symbol in the latency tolerant resources 130. If a subframe is then defined as having a fixed number of OFDM symbols regardless of numerology, then more than one low latency subframe will fall within a latency tolerant UE scheduling interval. For example, the latency tolerant UE scheduling interval may be an integer multiple of the low latency subframe. In other embodiments, the low latency resources 128 and the latency tolerant resources 130 have the same numerology. A low latency subframe may then be defined to have fewer OFDM symbols compared to the number of OFDM symbols in a latency tolerant UE scheduling interval, such that there will still be more than one low latency subframe within a latency tolerant UE scheduling interval. For example, the duration of a low latency subframe may be as short as a single OFDM symbol. It is also contemplated that the low latency transmission and the latency tolerant transmission may not have the same number of symbols per subframe, whether or not they have the same numerology. For example, a subframe may be defined as 1 ms, regardless of the numerology or number of OFDM symbols in the subframe.

In the example time-frequency resources 126 shown in FIG. 1, specific resource partitions are assigned for transmissions to UEs 102a, 102b, 104a, and 104b. However, the illustrated resource partitions are only an example. Also, in addition to time-frequency resources, other resources may be allocated for transmission to the UEs 102a, 102b, 104a, and 104b, such as code, power, and/or spatial resources.

In operation, data that is to be transmitted from the base station 100 to UEs is stored in the queues 108. For a particular downlink transmission, the scheduler 110 assigns available resources to respective UEs being served by the base station 100. Low latency data destined for low latency UEs is transmitted in the low latency resources 128, and latency tolerant data destined for latency tolerant UEs is typically scheduled in the latency tolerant resources 130. The scheduler 110 uses an algorithm to decide which resources should be assigned to which UEs. An example of an algorithm that may be used by the scheduler 110, to assign resources for low latency traffic, is a delay-based algorithm that takes account of the latency constraints of the low latency traffic. When just latency tolerant traffic is present, and/or when latency tolerant data is being scheduled on the low latency resources, then a proportionally fair (PF) scheduling algorithm may be used. In one embodiment, if both low latency data and latency tolerant data are available at the base station 100 for scheduling, the scheduler 110 employs delay-aware scheduling and puts latency tolerant data on hold for the next transmission opportunity. In some embodiments, the scheduler 110 may schedule latency tolerant data in resource region 128 and/or region 130, unless there is a restriction. For example, if the scheduler 110 determines that part of the low latency resource region 128 is empty, i.e. no low latency data scheduled for downlink transmission, then the scheduler 110 can opportunistically schedule latency tolerant data there. A latency tolerant data packet is usually slightly larger than a low latency data packet. Hence, if a latency tolerant data packet is scheduled in low latency resources 128, then the latency tolerant data scheduling may comprise scheduling over multiple low latency subframes. In some embodiments, the number of low latency subframes over which the latency tolerant data is scheduled may be indicated in a physical downlink control channel (PDCCH) of a latency tolerant transmission. As discussed below, one or more of the low latency subframes scheduled for latency tolerant traffic may be used for low latency traffic, which may result in puncturing/pre-emption of scheduled latency tolerant data. The latency tolerant UEs can be configured to monitor the indication control (e.g. the indicator sequences discussed later) if scheduled in the low latency resources.

When a resource partition is assigned to a UE, an appropriate number of bits are removed from the queue corresponding to that UE and sent to the downlink physical layer. The error control coder 114 encodes the bits using an error control code to result in coded bits. One example of an error control code that may be applied by the error control coder 114 is a turbo code. The coded bits output from the error control coder 114 may be subject to rate matching in rate matcher 116. The rate matcher 116 may match the number of bits in a transport block to the number of bits that can be transmitted in the given allocation, and the rate matching may involve sub-block interleaving, bit collection, and/or pruning. The modulator 118 then modulates the coded bits to generate modulated symbols. The resource mapper 120 maps the modulated symbols to the resources assigned to the UE. Pilot sequences, as well as the indicator sequences described later, are also mapped to resources by the resource mapper 120.

UE 104a is illustrated in more detail in FIG. 1 and includes one or more antennas 152 for receiving the downlink transmissions 124. Only one antenna 152 is illustrated. The UE 104a includes a receiver 154 for processing the received downlink transmissions 124. For example, the receiver 154 may implement downlink physical layer processing, such as decoding and demodulation to extract the data, pilot sequences and signaling destined for UE 104a. A decoder 155 for performing decoding is illustrated. A signaling extractor 156 is coupled to or integrated with the receiver 154. The signaling extractor 156 extracts signaling, transmitted by the base station 100, that indicates modification of a latency tolerant transmission on the low latency resources. For example, the signaling extracted may be the indicator sequences discussed in detail below.

The receiver 154, the decoder 155, and the signaling extractor 156 may each be implemented by a processor that executes instructions that cause the processor to perform the operations of the receiver 154, the decoder 155, and the signaling extractor 156. The same or different processor may be used to implement each of the receiver 154, decoder 155, and the signaling extractor 156. Alternatively, the receiver 154, decoder 155, and/or the signaling extractor 156 may be implemented using dedicated integrated circuitry, such as an ASIC, GPU, or a FPGA for performing the functions of the receiver 154, the decoder 155, and/or the signaling extractor 156. UE 104a may include other circuitry and/or modules for performing other functions, e.g. a transmitter for transmitting uplink transmissions, but these have been omitted for the sake of clarity. UE 104b has a similar structure to UE 104a.

Low latency data may be bursty or sporadic in nature, and may be transmitted in short packets. There may not always be low latency data in the queues 108 of the base station 100 that needs to be transmitted using all of the low latency resources 128 that are reserved for low latency traffic. Therefore, the base station 100 may opportunistically schedule, on the low latency resources 128, latency tolerant data for a latency tolerant UE.

Figure 2:
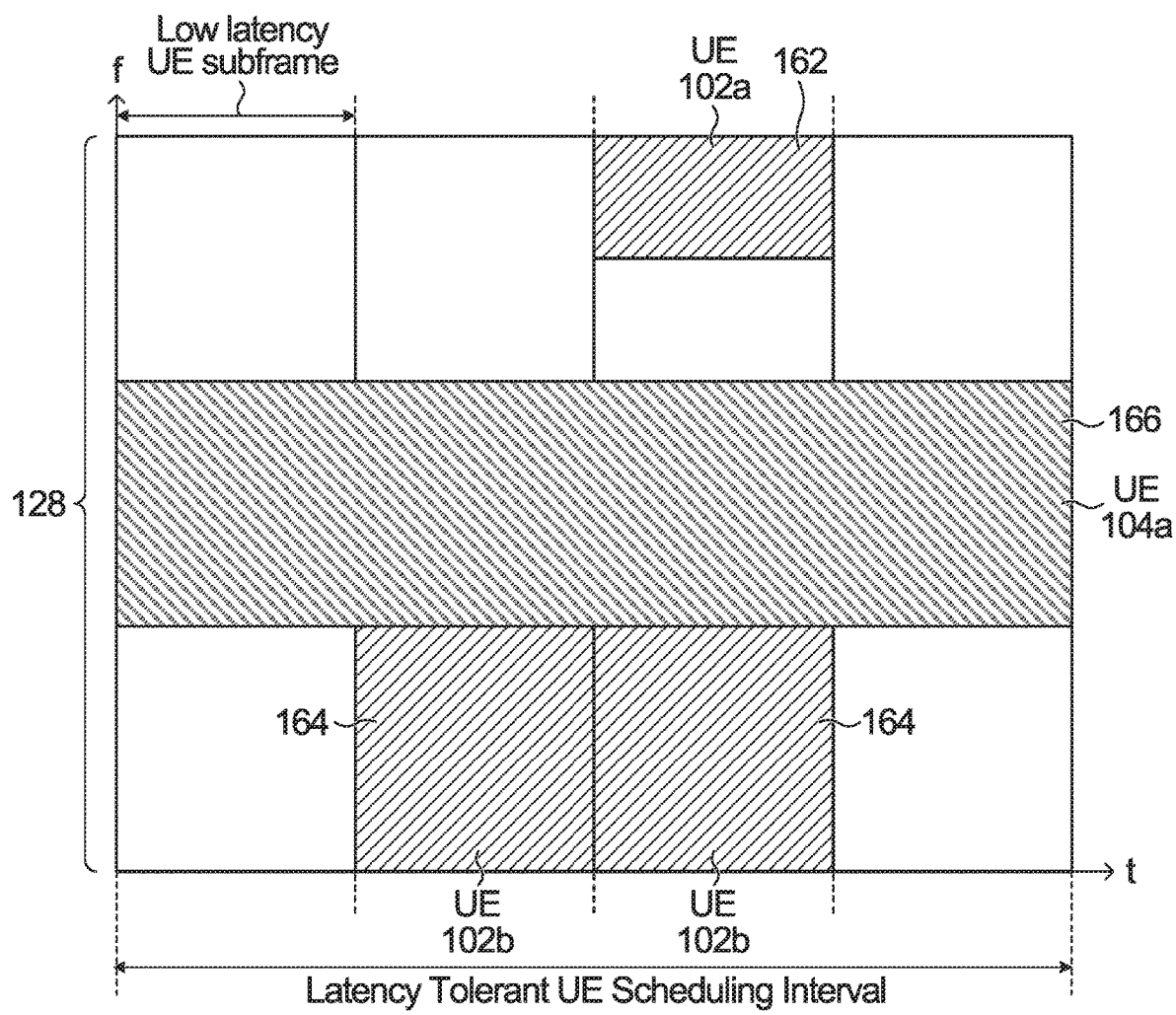
FIGS. 2 to 8 each illustrate low latency resources in more detail and show the opportunistic scheduling of latency tolerant data.

FIG. 2 illustrates a portion of the low latency resources 128 in more detail and shows the opportunistic scheduling of latency tolerant data. A duration in time equal to one latency tolerant UE scheduling interval is illustrated. Four low latency subframes fall within a single latency tolerant UE scheduling interval. This is only an example. There may be more or fewer low latency subframes that fall within a single latency tolerant UE scheduling interval.

In FIG. 2, an example is shown for scheduling one latency tolerant transmission and two low latency transmissions within region 128. However, within the time-frequency region 128, there can be other latency tolerant and low latency transmissions scheduled with different scheduling intervals. The configuration of region 128 implies that both latency tolerant and low latency traffic can be transmitted within this region. Optionally, no other restrictions, e.g., UEs receiving similar traffic type have same or different scheduling intervals, are imposed.

At the instance shown in FIG. 2, the base station 100 has data to send to UEs 102a, 102b, and 104a. UEs 102a and 102b are scheduled in the low latency resources 128, as respectively shown at 162 and 164. In order to improve resource utilization, the network may take advantage of the fact that there can be unused resources and that low latency traffic is sporadic. Therefore, the base station 100 also schedules a transmission of latency tolerant data to latency tolerant UE 104a on some of the unused low latency resources, as shown at 166. The amount of resources scheduled for a data transmission to UE 104a is at minimum one latency tolerant UE scheduling interval, which spans the four low latency subframes.

Note that UE 104a being assigned a scheduling interval of duration equivalent to four low latency subframes is only an example. A different UE, say UE 104b (not shown in FIG. 2), receiving latency tolerant traffic may be assigned a scheduling interval of three low latency subframes etc. If a low latency subframe comprises 2 OFDM symbols, then the scheduling intervals of UE 104a and UE 104b are 8 and 6 OFDM symbols, respectively.

The time-frequency resources 128 in which both low latency and latency tolerant data transmissions may take place may be updated: i) semi-statically, which implies that the time-frequency resources 128 can be semi-statically configured and the configuration is notified to the UE(s) by higher layer signaling, e.g., radio resource control (RRC) signaling or system information; and/or ii) dynamically, which implies that the time-frequency resources 128 are dynamically indicated to the UE(s), e.g., in downlink control information (DCI), i.e., a DCI may update/activate/deactivate a time-frequency region where both traffic can be scheduled or transmitted.

Figure 3:
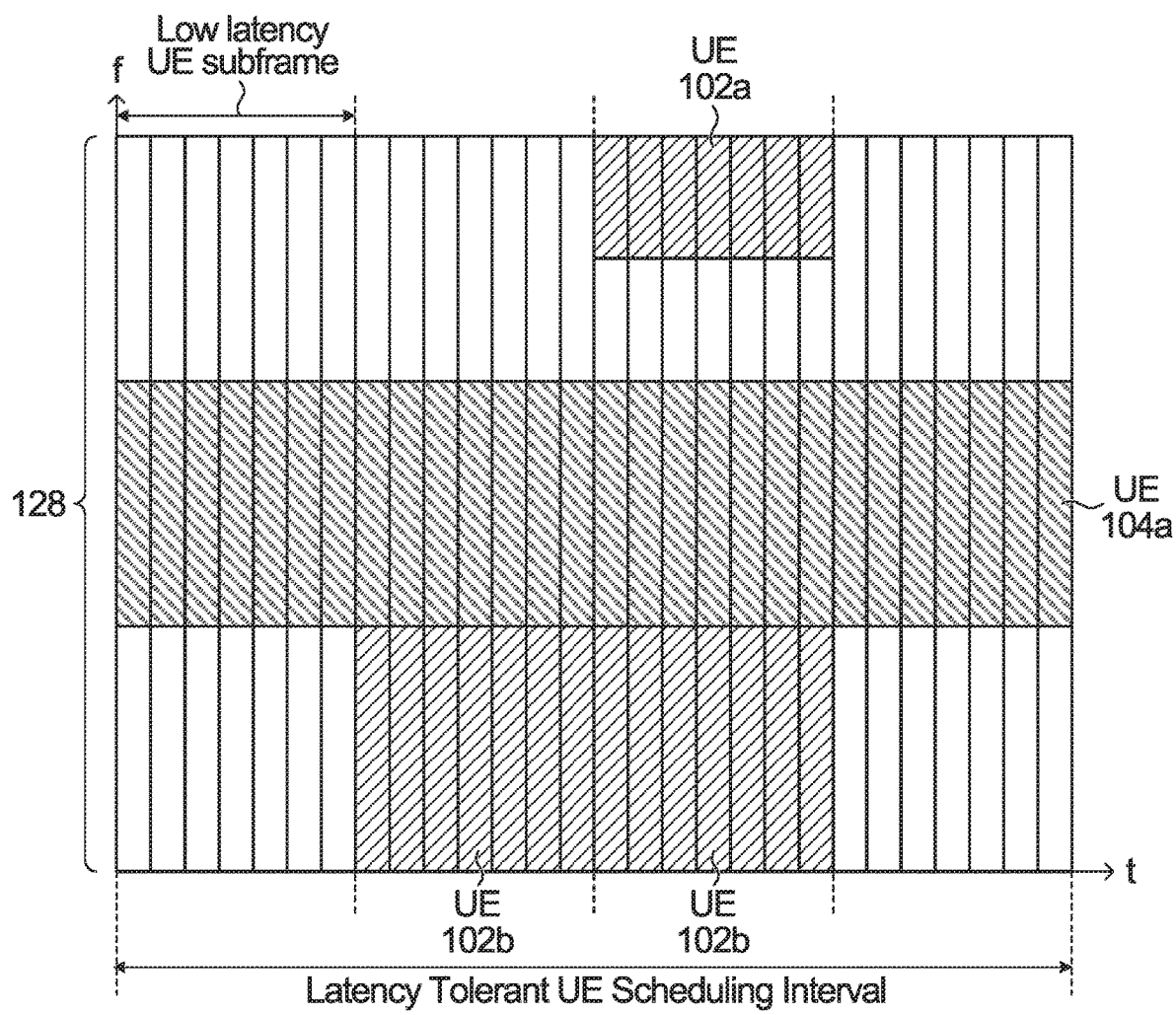

FIG. 3 is the same as FIG. 2, except that the boundary between OFDM symbols is illustrated. In the example in FIG. 3, each low latency subframe consists of seven OFDM symbols.

When latency tolerant UE data transmissions are opportunistically scheduled on the low latency resources 128, as in FIGS. 2 and 3, a method to control this co-existence may be used in order to preserve the desired latency properties of the low latency traffic, as well as to mitigate mutual interference and ensure the reliability of all traffic. For example, it may introduce an unacceptable amount of latency if a latency tolerant data transmission is scheduled on the low latency resources 128, and this causes a delay of newly arrived low latency data until the latency tolerant data transmission is finished. One possibility is for the base station to puncture some or all of the remainder of the latency tolerant data transmission to free low latency resources to allow for the newly arrived low latency data to be transmitted. However, the latency tolerant UE whose data has been punctured should be made aware of the puncturing, so that it does not attempt to decode the low latency data as part of its transmission, which may result in decoding errors and increased number of HARQ retransmissions.

Because both latency tolerant and low latency traffic can be scheduled in the time-frequency region 128, and the latency tolerant transmission can be punctured so that a low latency transmission may be sent instead, the time-frequency region 128 may alternatively be referred to as coexistence region or pre-emption region or pre-emption/puncturing indication region or impacted region.

Embodiments are disclosed below in which signaling in a low latency subframe indicates to the latency tolerant UE that there has been a modification relating to the latency tolerant transmission on the low latency resources. In some embodiments, signaling in a low latency subframe implies that a signaling notifying puncturing information can be transmitted every low latency subframe, for example, every three OFDM symbols. The signaling can be at the beginning of a low latency subframe, or at any suitable position in the latency tolerant scheduling interval such as the end of the latency tolerant scheduling interval. The latency tolerant interval can be any given interval that spans a longer duration than a low latency subframe in region 128. In the embodiments discussed below, the signaling is in the form of an indicator sequence transmitted as part of an OFDM symbol or the search space where indication control signal is monitored may comprise a group of symbols. The indicator sequence informs the latency tolerant UE what modification has occurred so that the latency tolerant UE may then take appropriate action when it decodes the transport block.

The latency tolerant UEs whose downlink transmission overlaps with or is sent within the low latency resources 128 may therefore need to monitor indication control signaling. The indication control signaling notifies a latency tolerant of any modification of its downlink transmission due to a low latency transmission puncturing part of the latency tolerant transmission. In some embodiments, low latency resources 128 change dynamically or semi-statically over time. In some embodiments, the latency tolerant UEs scheduled on the low latency resources 128 may be dynamically or semi-statically configured to monitor the indication control signaling.

Also, the terminologies 'indication control', 'indicator sequences', and 'indication control signaling' are interchangeably used herein. Furthermore, 'puncture' and 'preempt' imply the same meaning herein. Any data that is pre-erupted is punctured in that the data is not sent on the originally scheduled resource. The reverse is also true: any data that is punctured is pre-empted in that the data is not sent on the originally scheduled resource. The pre-empted data may or may not be sent on later time-frequency resources.

Figure 4:
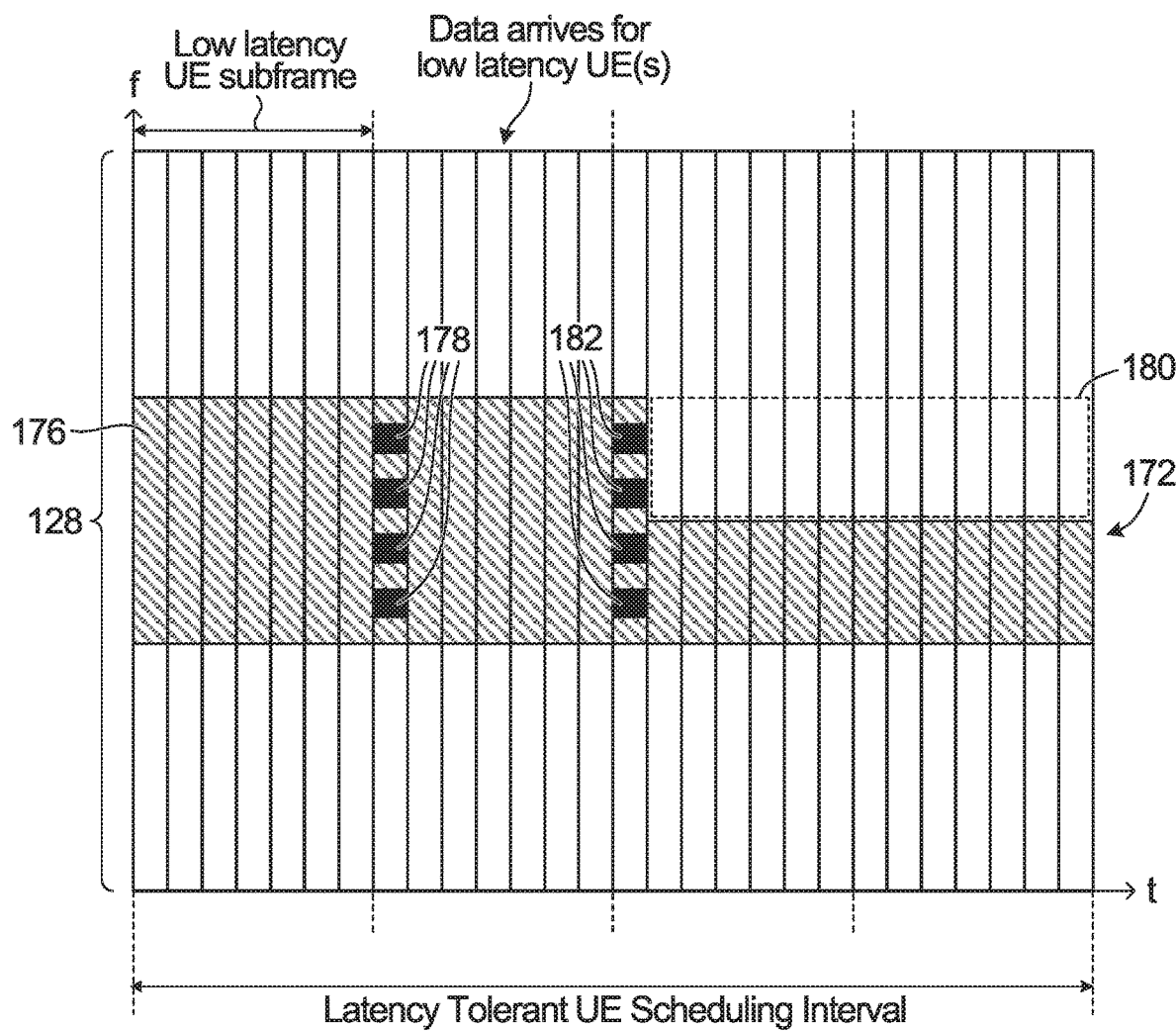

FIG. 4 illustrates the situation in which a partition 172 of low latency resources, shown in hatching, has been allocated for transmission of latency tolerant data to latency tolerant UE 104a. The duration of time scheduled is equal to a latency tolerant UE scheduling interval. In implementation, several latency tolerant UE scheduling intervals may be assigned to UE 104a, but only one latency tolerant UE scheduling interval is illustrated in FIG. 4.

The latency tolerant UE scheduling interval encompasses four low latency subframes. The first OFDM symbol of the first low latency subframe, shown at 176, does not include any indicator sequence for UE 104a in this example. Instead, UE 104a is informed by separate control information (not shown) that UE 104a is to receive a transmission on the partition 172. The control information may be present in the first one or few OFDM symbols of the first low latency subframe, or the control information may be located elsewhere, e.g. in the latency tolerant resource partition 130 or in another channel.

The first OFDM symbol of the second low latency subframe includes an indicator sequence 178 that indicates that there is no modification of the latency tolerant transmission in the second low latency subframe.

During the second low latency subframe, data arrives at the base station that is to be transmitted to low latency UEs, e.g. UE 102a and/or UE 102b. The base station 100 punctures some of the latency tolerant data in the third and fourth low latency subframes, as shown at 180. The puncturing is performed as follows: bits of the latency tolerant data that are scheduled to be transmitted on the low latency resources are not transmitted on those resources. This frees up the resources for low latency transmissions.

Another indicator sequence 182, located at the first OFDM symbol of the third low latency subframe, indicates that the latency tolerant data has been modified. The indicator sequence 182 also provides information indicating how the latency tolerant data has been modified, e.g. which data has been punctured. The UE 104a may then respond accordingly, e.g. by excluding the punctured data from the data it attempts to decode.

The scenario illustrated in FIG. 4 is only an example, and multiple variations are possible. In an alternative embodiment, indicator sequence 182 only indicates which data has been punctured in the third low latency subframe. Another indicator sequence is then also included in the first OFDM symbol of the fourth low latency subframe, which indicates which data has been punctured in the fourth low latency subframe. Having an indicator sequence at the start of each low latency subframe, except for the first low latency subframe, may allow for the base station 100 to dynamically decide, during the $k^{th}$ low latency subframe, how the latency tolerant data transmission will be modified (if at all) in the $(k+1)^{th}$ low latency subframe. The indication is then sent during the $(k+1)^{th}$ low latency subframe in FIG. 4.

In some embodiments, the low latency subframe may be as short as one OFDM symbol, and there may be an indicator provided in each OFDM symbol. Alternatively, instead of an indicator provided in each OFDM symbol, a single indicator may be provided at the end of the latency tolerant scheduling interval, as discussed below in relation to FIG. 8.

In an alternative embodiment, an indicator sequence may also indicate how the latency tolerant transmission is modified in one or more subsequent subframes. An example is discussed later in relation to FIG. 6.

In some embodiments, the absence of an indicator sequence in the first OFDM symbol of a low latency subframe is treated by UE 104a as an indication that there is no modification to the latency tolerant data transmission in that low latency subframe. For example, if no data is transmitted in the locations reserved for the indicator sequence, this could be interpreted as an indication that there is no modification to the latency tolerant data transmission. In another example, if the locations reserved for the indicator sequence contain a bit sequence that does not correspond to a valid indicator sequence, this sequence could be interpreted as an indication that there is no modification to the latency tolerant data transmission, and this sequence could optionally also contain data that may be decoded as part of the latency tolerant data transmission. The data transmission on the resources configured for indication can be for one or more of the UEs that are monitoring indication or different UE(s). Similar UE behavior applies when the indication is configured to be sent at the end of an interval. In the absence of the indication, or upon decoding an invalid bit sequence at the resource used for transmitting the indication at the end of the interval, then this implies that there has been no modification of the latency tolerant data transmission. When an indication is not sent, the resource on which the indication is not sent can be used for any downlink data or control transmission.

In some embodiments, blind decoding of the indicator sequences may be performed by UE 104a if downlink resources used for the indicator sequences are not reserved just for indicator sequences, but are instead dynamically shared between indicator sequences and other types of control and/or data.

In some embodiments, an indicator sequence may be used that informs the UE 104a that the rest of the latency tolerant data in the latency tolerant scheduling interval has been punctured. When the UE 104a receives this indicator, the UE 104a may then stop buffering the data received in that scheduling interval. The UE 104a may then request a hybrid automatic repeat request (HARQ) retransmission for the data, if the received data was insufficient to decode the transmission.

In FIG. 4, each indicator sequence is illustrated as being mapped to distributed resource element groups in an OFDM symbol, which is why indicator sequences 178 and 182 are each illustrated as comprising four separate black blocks. Mapping the indicator sequences to distributed resource element groups may increase robustness. In an alternative embodiment, the indicator sequences 178 and 182 might not be mapped to distributed resource element groups, depending on the required reliability level. Hence, the resource set containing indication control information may comprise contiguous or non-contiguous resource element groups.

In FIG. 4, the latency tolerant data transmission is modified upon arrival of data that is to be transmitted to low latency UEs. Alternatively, or additionally, the latency tolerant data transmission may be modified based on information received at the base station 100 indicating that more low latency UEs require low latency resources. If the low latency UE load increases, then the base station 100 may need to make provisions for more low latency data transmissions, and so the latency tolerant data transmission may be modified to free low latency resources.

In FIG. 4, the latency tolerant data transmission is modified by puncturing the latency tolerant data transmission, as shown at 180. The latency tolerant data transmission may be modified in other ways. As another example, the latency tolerant data transmission may be modified using rate matching to cause a reduction in the amount of resources needed to send the latency tolerant data transmission. As another example, power allocated to the latency tolerant data transmission may be reduced so that a low latency data transmission can be sent over the same time-frequency resources. For example, the power allocated to the latency tolerant transmission may be reduced to 33% of the total power, and the other 67% of the total power may then be used to make a low latency data transmission over the same time-frequency resources.

An indicator sequence provides information to the UE 104a indicating how the latency tolerant data transmission has been modified so that the UE 104a can take appropriate action. The information provided to the UE 104a in the indicator sequence may trigger fewer HARQ retransmissions compared to if the UE 104a is not aware that the latency tolerant data transmission has been modified, or compared to if the UE 104a is not aware of how the latency tolerant data transmission has been modified. The overhead of transmitting the indicator sequences may be less compared to appending a cyclic redundancy check (CRC) with every codeblock, e.g. as a form of protection against bursty interference from sporadic low latency traffic.

The use of multiple indicator sequences allows for different levels of response for controlled co-existence. Here, use of multiple indicator sequences implies that the transmitted indication can map to multiple options, which requires an indication signal to contain one or more bits. As one example, there may be five possible indicator sequences that can be generated and transmitted by the base station: 000, 101, 110, 011, and 111. One of the indicator sequences is placed in the first OFDM symbol of each low latency subframe of each latency tolerant UE scheduling interval, except for the first low latency subframe. The indicator sequence 000 indicates to the UE 104a that there has been no modification of the latency tolerant UE data transmission in that subframe. The indicator sequence 101 indicates to the UE 104a that all of the latency tolerant data has been punctured in that subframe. The indicator sequence 110 indicates to the UE 104a that all of the latency tolerant data carried by the subcarriers in the top half of partition 172 has been punctured in that subframe. The indicator sequence 011 indicates that the power dedicated to transmitting the latency tolerant data in that subframe has been reduced by 33%. The indicator sequence 111 indicates that the power dedicated to transmitting the latency tolerant data in that subframe has been reduced by 66%.

Figure 5:
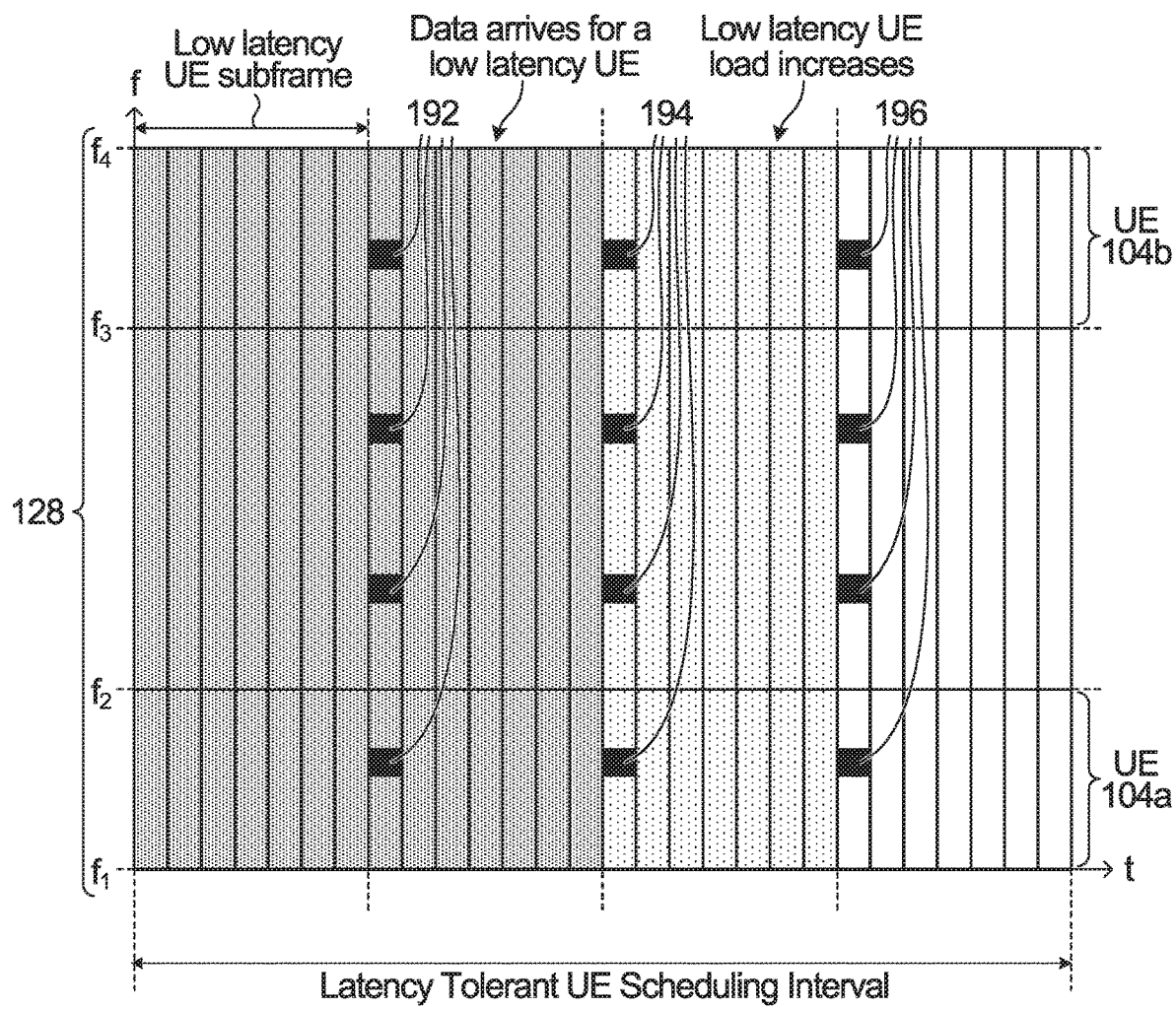

In FIG. 4, the indicator sequence is sent in a respective unicast transmission to each latency tolerant UE that is scheduled on the low latency resources. FIG. 5 illustrates an example in which the indicator sequences are broadcast to all latency tolerant UEs that are scheduled in the low latency resources 128. In the example in FIG. 5, the indicator sequence is spread across resource element groups distributed throughout the whole low latency frequency band 128, although the indicator sequence can alternatively be centralized in a single resource element or a number of contiguous resource elements. The indicator sequence is common for all latency tolerant UEs in FIG. 5, and the latency tolerant UEs need to know where to find the indicator sequence in the first OFDM symbol.

For the example illustrated in FIG. 5, broadcasting the indication signaling implies that the content of the indication signaling is common for the group of UEs who receive transmissions in the low latency resources 128. Hence, the broadcast or group-common control signaling corresponds to the time-frequency resource 128, i.e., the control signaling provides puncturing information within region 128.

In the example in FIG. 5, different latency tolerant UEs may be scheduled on different resources of the low latency resources. For example, UE 104a is scheduled between frequencies $f_1$ and $f_2$, and UE 104b is scheduled between frequencies $f_3$ and $f_4$.

The indicator sequence 192 broadcast in the first OFDM symbol of the second low latency subframe indicates that there has been no modification to the latency tolerant data transmissions.

The indicator sequence 194 broadcast in the first OFDM symbol of the third low latency subframe indicates that the power allocated to the latency tolerant data transmissions has been reduced by 66%. Indicator sequence 194 is broadcast because in the second low latency subframe some low latency data arrived which the base station 100 has scheduled for transmission during the third low latency subframe, e.g. using the same time-frequency resources as the latency tolerant data transmissions.

The indicator sequence 196 broadcast in the first OFDM symbol of the fourth low latency subframe indicates that all latency tolerant data has been punctured in the fourth low latency subframe. Indicator sequence 196 is broadcast because in the third low latency subframe the base station 100 received an indication that the number of low latency UEs served by the base station, i.e. the low latency UE load, has increased.

As an example, there may be four possible indicator sequences that can be generated and broadcast by the base station: 00, 01, 10, and 11. Indicator sequence 00 indicates that during the low latency subframe there is no modification to the latency tolerant data transmission scheduled on the low latency resources 128. Indicator sequence 01 indicates that during the low latency subframe there is a power reduction of 33% for the latency tolerant data transmission scheduled on the low latency resources 128. Indicator sequence 10 indicates that during the low latency subframe there is a power reduction of 66% for the latency tolerant data transmission scheduled on the low latency resources 128. Indicator sequence 11 indicates that during the low latency subframe the latency tolerant data scheduled on the low latency resources 128 is punctured. Following this example, then indicator sequence 192 is 00, indicator sequence 194 is 10, and indicator sequence 169 is 11. As discussed above, more hits can be added and different options can be considered for providing the indication. As another example: the indication signal may consist of three hits of payload; the indicator sequence 000 indicates that there has been no modification of the latency tolerant UE data transmission in that subframe; the indicator sequence 101 indicates that all of the subframe has been punctured within region 128; the indicator sequence 110 indicates that the subcarriers in the top half of partition 128 has been punctured in that subframe.

Also, how the base station modifies the latency tolerant transmission, and accordingly what indicator sequence to send, may be decided by the base station based on the low latency UE load. For example, indicator sequence 00 may correspond to a low latency UE load of 0-9 UEs, indicator sequence 01 may correspond to a low latency UE load of 10-19 UEs, indicator sequence 10 may correspond to a low latency UE load of 20-29 UEs, and indicator sequence 11 may correspond to a low latency UE load of greater than 30 UEs. Here, the latter example implies that a given loading of low latency UEs may result in certain indication information, for example, UE load of 10-19 UEs implies no modification. UEs can be configured by higher layer signaling. In another example, latency tolerant UEs may not need to know the mapping between loading of UEs and corresponding information provided. This can be a network implementation.

Overhead may be reduced by broadcasting the indicator sequences, as in FIG. 5, rather than sending a unicast transmission to each latency tolerant UE scheduled on the low latency resources 128. Broadcasting the indicator sequences may be particularly suitable to cases where the signaling is common to all latency tolerant UEs (e.g., all latency tolerant UEs experience the same modification or puncturing), for example if the low latency subband is relatively narrow. Here, the signaling is common to latency tolerant UEs that are scheduled within/overlapping region 128.

In the example in FIG. 5, the latency tolerant data transmissions that are opportunistically scheduled on the low latency resources 128 can be modified based on factors such as the size of the low latency resource region, the arrival of low latency data for transmission, and the low latency UE load. The example in FIG. 5 may be more applicable when the latency tolerant UE load served by the base station 100 is large enough that different latency tolerant data transmissions for different latency tolerant UEs can be opportunistically scheduled over the whole low latency resource region. It may also be applicable when latency tolerant data over the whole low latency subframe may need to be modified to account for low latency (e.g. URLLC) load characteristics and/or arrival rate.

In some embodiments, the indicator sequences transmitted in FIG. 5 may also provide control information to the low latency UEs, e.g. to indicate the search space for resource assignment. More generally, information for the latency tolerant UEs, such as indicator sequences, and information for the low latency UEs may be present in the same time-frequency location, e.g. in the same OFDM symbols.

FIG. 5 is only an example, and many of the variations discussed above in relation to FIG. 4 are also possible.

Figure 6:
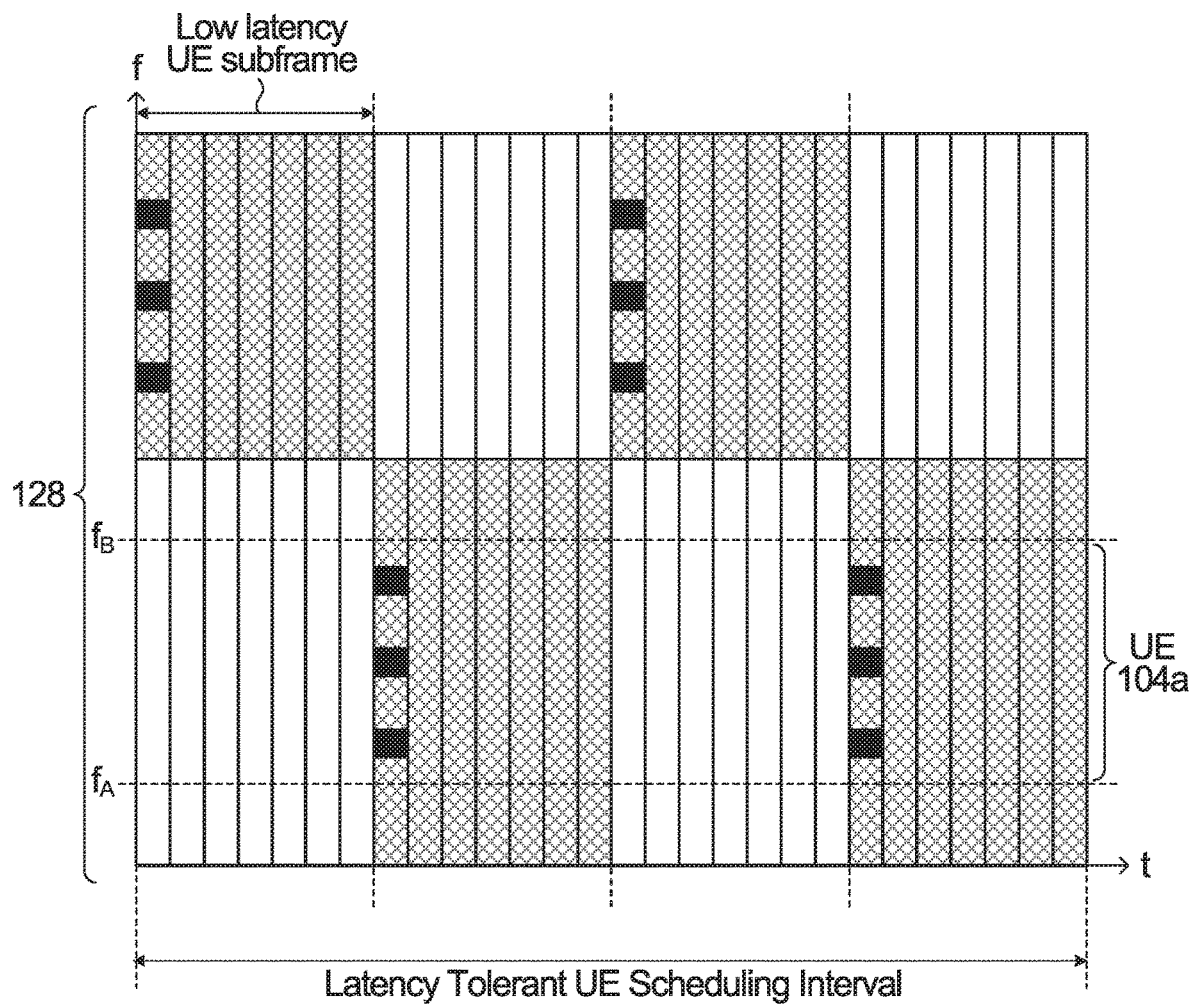

In some embodiments, the co-existence of the latency tolerant data transmissions and the low latency data transmissions in the low latency band may be controlled only in the retransmission zones. FIG. 6 illustrates an example in which the low latency resources 128 are partitioned into new transmission zones and retransmission zones. A retransmission zone is a partition of time-frequency resources that is reserved for sending retransmissions of data, e.g. HARQ retransmissions or automatic retransmissions of data having a high reliability requirement, whereas a new transmission zone is a partition of time-frequency resources in which no retransmissions are sent. The retransmission zones are shown in hatching. The partition of the low latency resources 128 into new transmission zones and retransmission zones, as shown in FIG. 6, is a logical partition and is only one example. Re-transmissions alternatively can be HARQ-less as well, i.e., one or more repetitions may follow after initial transmission for low latency UEs.

Latency tolerant data transmissions may be opportunistically scheduled in the low latency resources 128, possibly across new transmission zones and retransmission zones. For example, a latency tolerant data transmission for UE 104*a* is scheduled between frequencies $f_A$ and $f_B$. However, in FIG. 6, indicator sequences are only present in the retransmission zones. A possible benefit is that there is less overhead because indicator sequences are only transmitted by the base station 100 and processed by the latency tolerant UEs in the retransmission zones. The indicator sequences may be unicast or broadcast.

In some embodiments, a latency tolerant data transmission in a new transmission zone may be modified by the base station 100, but the latency tolerant UE is not notified. The latency tolerant UE is only notified of a modification of the latency tolerant data transmission in the retransmission zones. In other embodiments, a latency tolerant data transmission in a new transmission zone is never modified. Any modification to the latency tolerant data transmission is made in the retransmission zones only. If the latency tolerant data transmission in a new transmission zone is never modified, then either no low latency data is scheduled on the same resources as those already granted to the latency tolerant UE in the new transmission zones, or low latency data may be scheduled on the same resources as those already granted to the latency tolerant UE in the new transmission zones, and the two transmissions sharing the resources have interference.

The embodiments described above in relation to FIG. 6 may be modified so that the indicator sequences control co-existence in the new transmission zones also, with the latency tolerant data transmissions possibly being modified in a different way in the new transmission zones compared to the retransmission zones. As one example, when the latency tolerant data transmissions scheduled on the low latency resources 128 need to be modified by the base station 100 due to newly arrived low latency data or an increased low latency UE load, then the base station 100 may modify the latency tolerant data transmissions as follows: puncture latency tolerant data in a retransmission zone and reduce the power of the latency tolerant data in a new transmission zone.

The embodiments described above in relation to FIG. 6 may be modified so that an indicator sequence indicates how the latency tolerant transmission is modified in a future low latency subframe. For example, the base station may automatically retransmit data destined for a low latency UE, and an indicator sequence in a new transmission zone may indicate how the latency tolerant data transmission is modified in the retransmission zone in which the low latency data is retransmitted. The modification to the latency tolerant transmission may be different in the retransmission zone in which the low latency data is retransmitted. For example, the time-frequency location at which bits of the latency tolerant data transmission is punctured may be different in the retransmission zone compared to the new transmission zone. This example implies that if low latency UEs are scheduled with automatic re-transmissions or repetitions, the network may notify latency tolerant UEs which portion of subsequent subframes can be punctured. This can be based on the knowledge of where retransmission/repetition will take place.

In all of the embodiments discussed above, the indicator sequences are memoryless. That is, when a latency tolerant UE receives an indicator sequence at the start of a low latency subframe, the latency tolerant UE does not need to use information from a previous indicator sequence in order to determine what information the current indicator sequence is providing. To reduce overhead, in some embodiments the indicator sequences may not be memoryless, but may be differential indicators.

Figure 7:
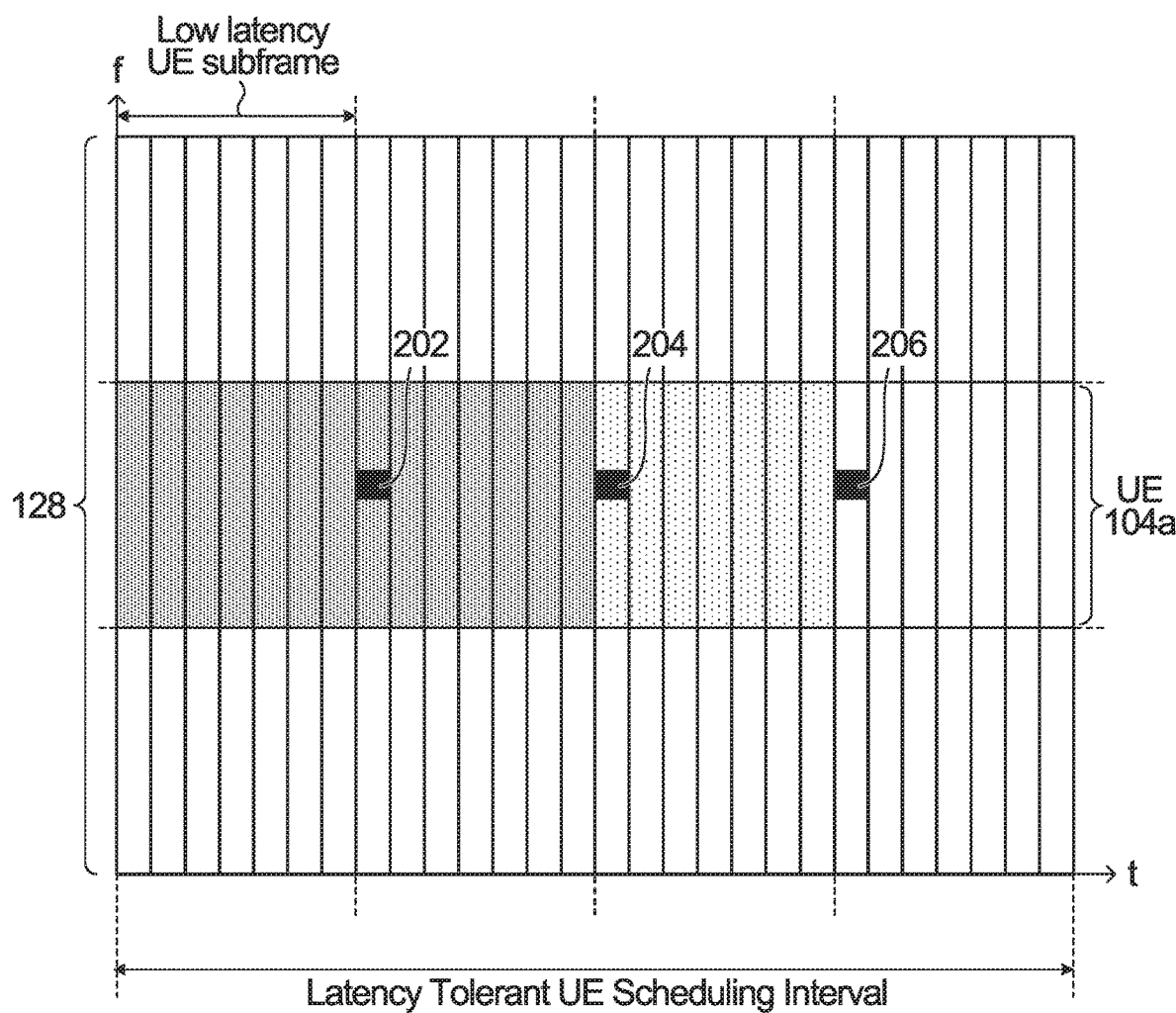

FIG. 7 illustrates an example in which the indicator sequence transmitted at the start of a low latency subframe is not memoryless. In the example of FIG. 7, indicator sequence 202, indicator sequence 204, and indicator sequence 206 are each a single bit flag having the value "1" or "0". The combination of the three indicator flags indicate how the regular data transmission is modified in each of the second, third, and fourth low latency subframes. Many different variations are possible, but as one example: when indicator sequence 202=0, indicator sequence 204=1, and indicator sequence 206=1, then the latency tolerant transmission in the second low latency subframe is not modified, the latency tolerant transmission in the third low latency subframe has its transmission power reduced by 50%, and the latency tolerant transmission in the fourth low latency subframe is punctured. This example is illustrated in FIG. 7. As another example: when indicator sequence 202=0, indicator sequence 204=1, and indicator sequence 206=0, then the latency tolerant transmission in the second low latency subframe is not modified, the latency tolerant transmission in the third low latency subframe has its transmission power reduced by 50%, and the latency tolerant transmission in the fourth low latency subframe is not modified.

Figure 8:
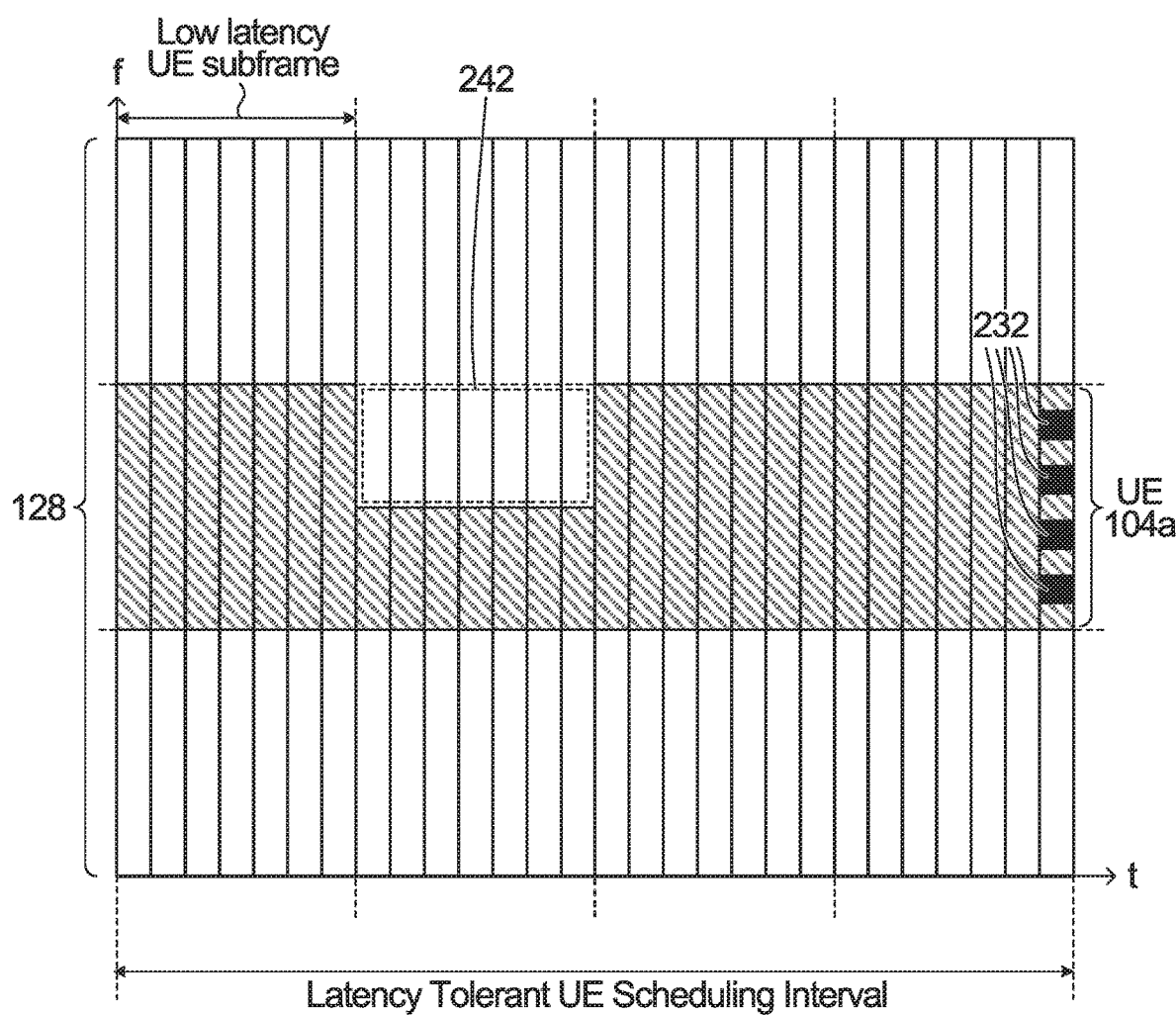

FIG. 8 illustrates an example in which only a single indicator sequence 232 for UE 104a is transmitted at the end of the latency tolerant UE scheduling interval. This indicator sequence 232 may be broadcast to multiple UEs or unicast to a single affected UE. If indicator sequence 232 is broadcasted to multiple UEs, then the multiple UEs, i.e. a group of UEs, monitor the configured resource near the end of the interval in which the indication signaling is provided. In this example, the latency tolerant UE scheduling interval implies any given interval, and the indication signaling is monitored near the end of the interval that potentially includes multiple scheduling durations of low latency transmissions. In other words, FIG. 8 implies an example where a group of UEs scheduled overlapping/within region 128 monitor a common signaling 232 at the end of an interval.

FIG. 8 shows an example for unicast transmission of the indication, and the resources where the indication is sent is within the scheduled portion of the transmission to UE 104a. If the indication is a group-common signaling, the resources where indication is monitored may span resources of one or multiple transmissions. The indicator sequence 232 may instead be transmitted at another location near the end of the latency tolerant UE scheduling interval, e.g. in the first OFDM symbol of the last low latency subframe of the latency tolerant UE scheduling interval. UE 104a does not start decoding before the end of the latency tolerant UE scheduling interval, and so only a single indicator 232 is used to indicate to UE 104a how the latency tolerant data transmission has been modified in the latency tolerant UE scheduling interval. A possible benefit of the embodiment in FIG. 8 may include less overhead and/or no need for dynamic monitoring in every low latency subframe. UE 104a buffers the received signal in its resources for the entire latency tolerant UE scheduling interval, and the indicator sequence in the last OFDM symbol (or near the end of the scheduling interval) will indicate how the latency tolerant transmission has been modified in the scheduling interval, if at all. The embodiment of FIG. 8 may be particularly suited to implementations in which the modification to the latency tolerant transmission is puncturing. However, a sufficiently long indicator sequence may also contain information about other forms of modification. The indicator sequence 232 can indicate which resource elements of the latency tolerant UE scheduling interval have been punctured, and the decoder 155 in UE 104a may then ignore the punctured bits when performing decoding. By not having a separate indicator sequence in each low latency subframe (except for the first low latency subframe), then UE 104a may need to buffer more bits of the received signal. However, the absence of an indicator symbol in each low latency subframe allows an entire low latency subframe to contain data for the low latency UE. Note that if the indication is common to a group of UEs, the resources carrying the indication may not be contained within the scheduled resources of one UE's transmission, shown in FIG. 8. Instead, it could be transmitted in a given location or resources at the end of the interval, which may or may not overlap with any latency tolerant transmission. The same applies to the example illustrated in FIG. 5: the resource elements containing the indication signal may be inside or outside the scheduled resources of the latency tolerant transmission(s). In some embodiments, how many occasions and/or where a UE monitor indication after the UE is scheduled is configured by higher layer signaling, e.g., RRC signaling.

The indication signaling monitored near the end of a given interval may or may not provide puncturing information for the whole interval. In some embodiments, the indication signaling provides puncturing information for a portion of the interval. For example, if the indication signaling is monitored near the end of every X OFDM symbols (i.e., interval length is X OFDM symbols) for a given numerology, the signaling may provide puncturing information for N OFDM symbols within the interval of length X OFDM symbols, N≤X. N symbols may be further divided into smaller segments of K symbols, such as low latency sub-frames, where K≤N. In the example of FIG. 8: K is the number of OFDM symbols in a low latency subframe, X is the number of OFDM symbols in the latency tolerant UE interval, and N is the number of OFDM symbols in the latency tolerant UE interval minus the OFDM symbols in the first low latency subframe. As mentioned earlier, in some embodiments the indication signaling may not indicate whether there is puncturing in the first low latency subframe. In an alternative, embodiment, the signaling may provide puncturing information for N OFDM symbols that appeared before the monitoring occasion of indication control signaling. The monitoring occasion can be every X symbols and in this example N≤X may still be valid. Similarly, the monitoring occasion can be every X slots and the signaling may provide puncturing information for N slots that may include the slot where indication is monitored and previous slots or N previous slots only. In this case, N≤X may still be valid. In some embodiments, the indication control signaling is monitored every X symbols or slots, for a given numerology. Value of X can be configurable and can be different for different numerologies, i.e., different subcarrier spacing and/or CP types. In one example, value of X, i.e., the monitoring periodicity in symbols or slots, can be scalable across numerologies. For example, if monitoring periodicity is X symbols in subcarrier spacing $f_0$ kHz, the periodicity can be $2^N*X$ symbols for subcarrier spacing $f_N=2^N*f_0$ kHz for same CP overhead. The scalable relationship in terms of symbols may or may not hold different CP overhead is used for different subcarrier spacing. In another example, if monitoring periodicity is X slots in subcarrier spacing $f_0$ kHz, the periodicity can be $2^N*X$ slots for subcarrier spacing $f_N=2^N*f_0$ kHz for same or different CP overhead. This is because slot duration is same for same or different CP overhead, e.g., a slot with normal CP overhead may comprise 7 symbols and with extended CP may comprise 6 symbols, but both have same duration in ms. Any value of $f_0$ is possible. In particular, values of $f_0$ can be chosen from {3.75, 7.5, 15, 30, 60, 120, 240, 480} kHz. The scalable monitoring periodicity in terms of symbols or slots imply that periodicity in ms can be the same across all numerologies. The periodicity can be configured. On the other hand, if monitoring periodicity is X symbols in subcarrier spacing $f_0$ kHz, the periodicity can be $2^{-N}*X$ symbols for subcarrier spacing $f_N=2^{-N}*f_0$ kHz for same CP overhead. In another example, if monitoring periodicity is X slots in subcarrier spacing $f_0$ kHz, the periodicity can be $2^{-N}*X$ slots for subcarrier spacing $f_N=2^{-N}*f_0$ kHz for same or different CP overhead.

In the example in FIG. 8, the indicator sequence 232 indicates that latency tolerant data that was scheduled for transmission on resources 242 of the second low latency subframe was punctured. For example, the indicator sequence may be a bitmap containing a bit corresponding to each low latency subframe, indicating whether that low latency subframe has been punctured. That is, the indication control information may have a time granularity, e.g. one bit for each time segment, such as one bit for each low latency subframe, i.e., one bit for each K consecutive symbols in time. For the example mentioned in the paragraph above, one bit may represent the status of puncturing for a duration or time granularity of K symbols, e.g. where K symbols is one low latency subframe. The time granularity may be changed if control overhead is a concern, e.g. one bit for each pair of adjacent low latency subframes, i.e., one bit indicates status of a time duration comprising 2K symbols.

Alternatively, the indicator sequence may contain a value for each subframe indicating what portion of that subframe has been punctured, e.g. "00" to indicate no puncturing, "10" to indicate 50% puncturing. By using more bits, finer granularity can be supported for providing puncturing information corresponding to different portions of a low latency sub-frame. For example, "11" may indicate to puncture the top half of the frequency resources (upper subcarriers) in a low latency subframe, and "01" may indicate to puncture the bottom half of the frequency resources (lower subcarriers) that low latency subframe.

As mentioned above, the indication control signal may comprise a bit sequence which provides time and/or frequency domain pre-emption information for a time-frequency region. The bit sequence indicates pre-emption information based on a given or configured or adapted time and/or frequency granularity. In some embodiments, scalable relationship may also hold for the time and/or frequency granularities used for providing pre-emption/puncturing information in the control signaling. For example, if L symbols is configured as time granularity for subcarrier spacing $f_0$ kHz, then $2^N*L$ symbols can be time granularity for sub-carrier spacing $2^N*f_0$ kHz for a given CP type. Moreover, if L slots is configured as time granularity for subcarrier spacing $f_0$ kHz, then $2^N*L$ slots can be time granularity for sub-carrier spacing $2^N*f_0$ kHz for any CP type, i.e., normal or extended CP. As mentioned above, slot duration can be same for normal and extended CP for a given subcarrier spacing. Scalable time granularity across numerologies may imply common duration in ms for time granularity across numerologies. Moreover, if L symbols is configured as time granularity for subcarrier spacing $f_0$ kHz, then $2^{-N}*L$ symbols can be time granularity for sub-carrier spacing $2^{-N}*f_0$ kHz for a given CP type. If L slots is configured as time granularity for subcarrier spacing $f_0$ kHz, then $2^{-N}*L$ slots can be time granularity for sub-carrier spacing $2^{-N}*f_0$ kHz for any CP type, i.e., normal or extended CP. On the other hand, frequency granularity can be scalable across numerologies. For example, if L RBs or RBGs is configured as frequency granularity for subcarrier spacing $f_0$ kHz, then $2^{-N}*L$ RBs or RBGs can be frequency granularity for sub-carrier spacing $2^N*f_0$ kHz. Alternatively, if L RBs or RBGs is configured as frequency granularity for subcarrier spacing $f_0$ kHz, then $2^N*L$ RBs or RBGs can be frequency granularity for sub-carrier spacing $2^{-N}*f_0$ kHz. This may imply that common frequency granularity in Hz can be adopted for all numerologies. Any value of $f_0$ is possible. In particular, values of $f_0$ can be chosen from {3.75, 7.5, 15, 30, 60, 120, 240, 480} kHz.

In some embodiments, the indicator sequence may instead be a differential indicator, with the first bit or set of bits indicating a modification in the first subframe, and subsequent sets of bits indicating changes in the modification relative to a previous subframe.

In all of the embodiments described above in relation to FIGS. 2 to 8, the indicator sequences are separate from any pilot sequences sent in the downlink. However, a variation is also possible in which the pilot sequences also act as indicator sequences. That is, each pilot sequence, when decoded by the latency tolerant UE, is also an indication of how (if at all) the latency tolerant data transmission has been modified. The base station and the latency tolerant UEs would know a priori which pilot sequences correspond to which indications, and the base station selects the appropriate pilot sequence based on the indication the base station wants to communicate.

Returning to FIG. 1, in operation the indicator sequences discussed above are generated in the base station 100 by signaling generator 112, e.g. in response to an indication that there is newly arrived low latency data to be transmitted using the low latency resources 128 and/or in response to an indication that the low latency UE load has increased. The indicator sequences are then mapped to their destined resources using the resource mapper 120 and transmitted in the downlink transmission 124 via antennas 122. The downlink transmission is received by UE 104a via antenna 152, and physical layer processing is performed in the receiver 154. The receiver 154 decodes the downlink transmission in decoder 155. The signaling extractor 156 extracts the indicator sequences meant for UE 104a. The indicator sequences may be sent on downlink resources reserved for the indicator sequences, in which case the signal extractor 156 obtains the indicator sequences from those reserved resources. In other embodiments, if the resources used for indicator sequences are dynamically shared with other control and/or data, then blind decoding may be performed by UE 104a in order to extract the indicator sequences from the downlink transmission. Once the indicator sequences meant for UE 104a are obtained by UE 104a, the signaling extractor 156 processes the indicator sequences to gain information regarding whether and how the latency tolerant transmission, that uses the low latency resources and that is destined for UE 104a, has been modified. The UE 104a may then take action based on the information in the indicator sequence. For example, the decoder 155 of the UE 104a may modify the decoding of the latency tolerant data based on the indication of how the latency tolerant data transmission has been modified by the base station. As one example, if the indicator sequence indicates that particular latency tolerant data, transmitted using the low latency resource, has been punctured, then the decoder 155 may ignore the bits received in the punctured region when decoding. If the indicator sequence indicates that the power of the latency tolerant transmission has been reduced only, then the decoder 155 might not modify its operation. However, decoding performance may suffer due to reduced or non-uniform power distribution over the latency tolerant UE scheduling interval. UE 104b operates in a similar manner to UE 104a.

In the base station 100, when the latency tolerant data transmission is to be modified, the modification is performed by the transmission modifier 121. For example, the transmission modifier 121 may puncture bits of the latency tolerant data transmission or issue an instruction to reduce the transmission power used to transmit the latency tolerant data transmission.

Figure 9:
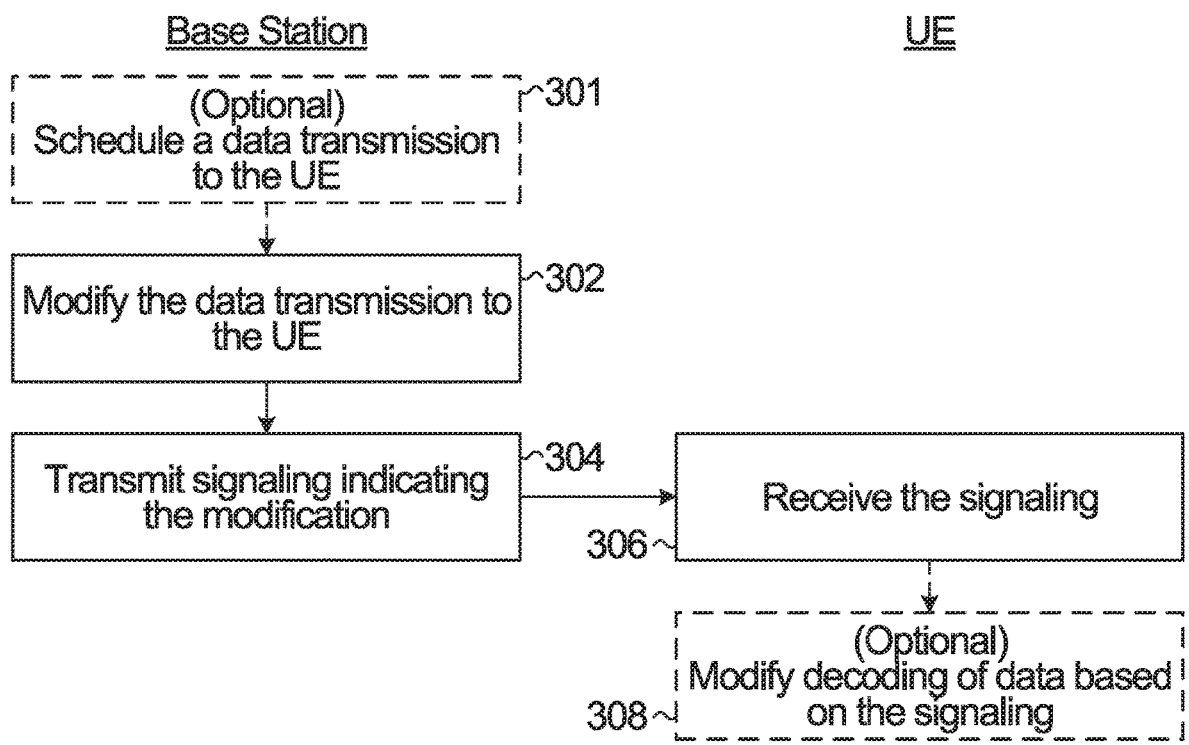
FIG. 9 is a method performed by a base station and a UE, according to one embodiment.

FIG. 9 is a method performed by a base station and a UE, according to one embodiment. In step 301, the base station optionally schedules a transmission of latency tolerant data to be sent to a latency tolerant UE. In step 302, the base station modifies a data transmission to the UE. The UE may be a latency tolerant UE, and the data transmission may use low latency resources. The modification may be puncturing or reducing transmission power, as discussed in the examples above. In step 304, the base station transmits signaling indicating that the data transmission has been modified. In step 306, the UE receives the signaling. Optionally, in step 308, the UE modifies decoding of the data based on the signaling, e.g. by ignoring bits received in the punctured region when the modification is puncturing.

Figure 10:
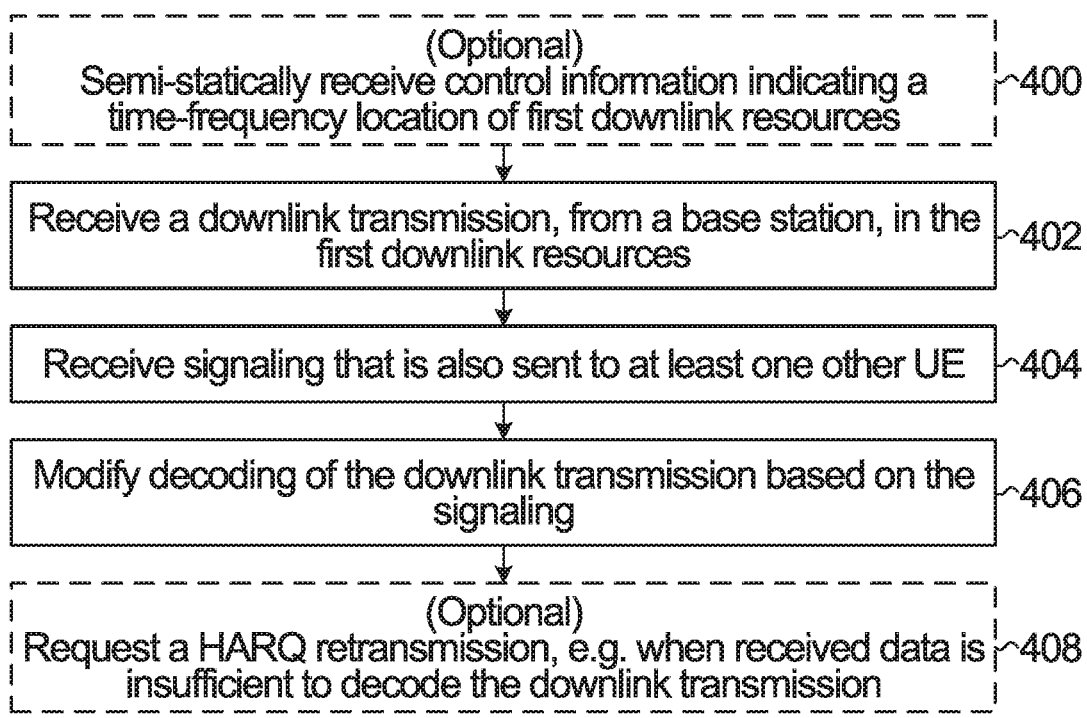
FIG. 10 is a method performed by a UE, according to one embodiment.

FIG. 10 is a method performed by UE 104a, according to one embodiment. Optionally, in step 400, the UE 104a semi-statically receives control information indicating a time-frequency location of first downlink resources 128. In step 402 UE 104a receives a downlink transmission, from base station 100, in the first downlink resources 128. In step 404, the UE 104a receives signaling. The signaling is also sent to at least one other UE 104b. The signaling indicates that data on a portion of the first downlink resources 128 has been punctured. In step 406, the UE 104a modifies decoding of the downlink transmission based on the signaling. Optionally, in step 408, the UE 104a requests a HARQ retransmission, e.g. when received data is insufficient to decode the downlink transmission.

Figure 11:
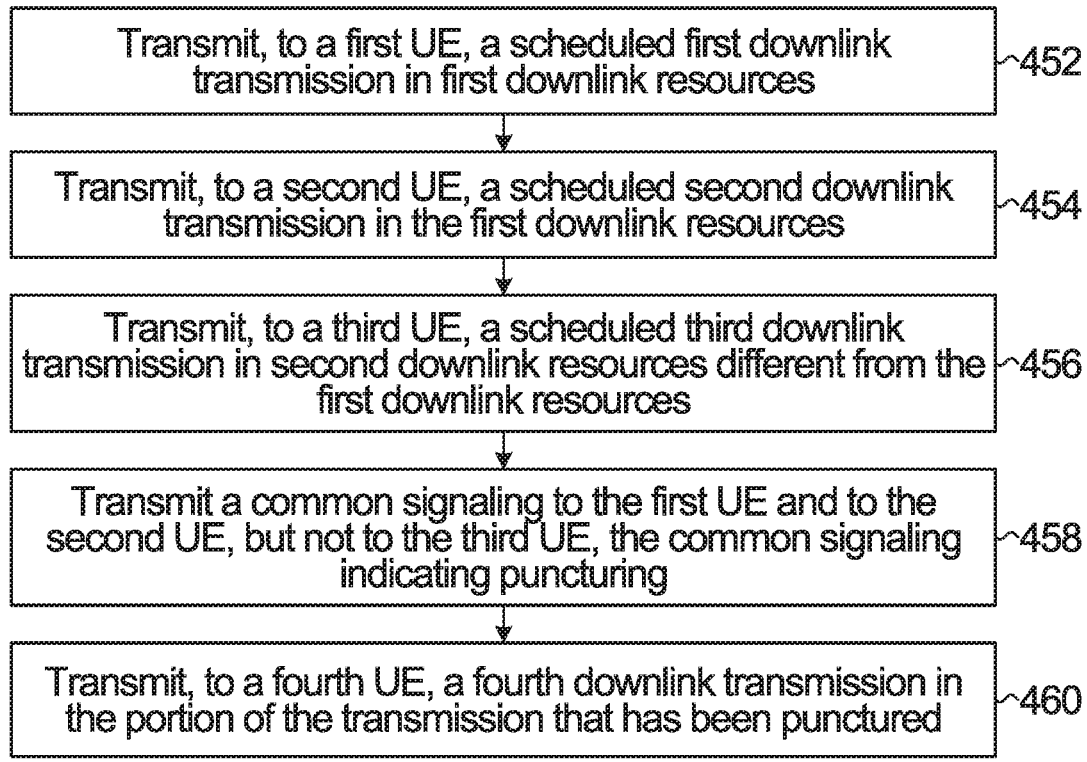
FIG. 11 is a method performed by a base station, according to another embodiment.

FIG. 11 is a method for wireless communication performed by base station 100, according to one embodiment. In step 452, the base station 100 transmits, to a first UE 104a, a scheduled first downlink transmission in first downlink resources 128. In step 454, the base station 100 transmits, to a second UE 104b, a scheduled second downlink transmission in the first downlink resources 128. In step 456, the base station 100 transmits, to a third UE, a scheduled third downlink transmission in second downlink resources 130 different from the first downlink resources 128. In step 458, the base station 100 transmits a common signaling to the first UE 104a and to the second UE 104b, but not to the third UE. The common signaling indicates that a portion of at least one of the first downlink transmission and the second downlink transmission has been punctured. In step 460, the base station 100 transmits, to a fourth UE 102a, a fourth downlink transmission in the portion of the at least one of the first downlink transmission and the second downlink transmission that has been punctured.

OTHER EXAMPLE METHODS AND SYSTEMS

Example 1

A method performed by a base station, the method comprising: scheduling a first transmission of first data to a first UE on first resources; transmitting second data to a second UE on a portion of the first resources; signaling to the first UE that the first transmission has been modified.

Example 2

The method of Example 1, wherein the second data has a lower latency requirement than the first data.

Example 3

The method of Example 1 or Example 2, wherein the signaling indicates how the first transmission has been modified.

Example 4

The method of Example 3, wherein the signaling comprises a plurality of bits, and wherein different combinations of the plurality of bits signal different ways in which the first transmission has been modified.

Example 5

The method of Example 3 or Example 4, wherein the signaling is transmitted on the first resources.

Example 6

The method of Example 5, wherein the first transmission is scheduled over a time interval that includes a plurality of low latency subframes.

Example 7

The method of Example 6, wherein the signaling is transmitted during at least one of the plurality of low latency subframes.

Example 8

The method of Example 7, wherein the signaling is transmitted in a first OFDM symbol of one of the low latency subframes.

Example 9

The method of Example 7, wherein the signaling is transmitted in at least one OFDM symbol in the last low latency subframe of the time interval.

Example 10

The method of Example 9, wherein the signaling is transmitted in the last OFDM symbol in the last low latency subframe of the time interval.

Example 11

The method of Example 9, wherein the signaling is transmitted in the first OFDM symbol in the last low latency subframe of the time interval.

Example 12

The method of Example 7, wherein for a particular subframe of the plurality of low latency subframes, the signaling indicates how the first transmission has been modified during the particular subframe.

Example 13

The method of Example 12, wherein the signaling additionally indicates how the first transmission has been modified during at least one other subframe of the plurality of low latency subframes.

Example 14

The method of Example 7, wherein for a particular subframe of the plurality of low latency subframes, the signaling indicates how the first transmission has been modified during at least one other subframe of the plurality of low latency subframes.

Example 15

The method of Example 7, wherein signaling indicates, for at least one of the plurality of low latency subframes, whether the first transmission has been modified during that low latency subframe.

Example 16

The method of Example 15, wherein signaling comprises a plurality of bits transmitted during the last subframe of the plurality of low latency subframes.

Example 17

The method of Example 6, wherein the signaling is sent as part of the first transmission.

Example 18

The method of Example 17, wherein the signaling is sent in an initial low latency subframe of the plurality of low latency subframes.

Example 19

The method of Example 6, wherein the signaling is not sent as part of the first transmission.

Example 20

The method of Example 19, wherein the signaling is sent in a latency tolerant resource partition.

Example 21

The method of any one of Examples 1 to 20, wherein the first resources comprise time-frequency resources in a time-frequency region used for downlink transmission of low latency data.

Example 22

The method of Example 21, further comprising modifying the time-frequency region used for the downlink transmission of the low latency data dynamically or semi-statically over time.

Example 23

The method of any one of Examples 1 to 22, wherein the signaling comprises a bit sequence, and wherein a valid bit sequence indicates how the first transmission has been modified, and wherein an invalid bit sequence indicates that the first transmission has not been modified.

Example 24

The method of Example 23, wherein the invalid bit sequence is data of the first transmission.

Example 25

The method of any one of Examples 1 to 24, wherein the signaling further comprises control information for the second UE.

Example 26

The method of Example 25, wherein the control information is present in the same time-frequency location as the signaling indicating that the first transmission has been modified.

Example 27

The method of any one of Examples 1 to 26, wherein the signaling comprises a pilot sequence.

Example 28

The method of Example 27, further comprising selecting the pilot sequence based on how the first transmission has been modified.

Example 29

The method of any one of Examples 1 to 28, further comprising mapping the signaling to distributed resource element groups in an OFDM symbol.

Example 30

The method of any one of Examples 1 to 29, wherein the signaling is sent on downlink resources reserved for the signaling.

Example 31

The method of any one of Examples 1 to 30, wherein the signaling is dedicated to the first UE, and wherein the signaling is transmitted to the first UE in a unicast transmission to the UE.

Example 32

The method of any one of Examples 1 to 30, wherein the signaling is sent to a plurality of UEs including the first UE.

Example 33

The method of Example 32, wherein the plurality of UEs include a third UE, and wherein the method further comprises scheduling a transmission of third data to the third UE on third resources; and wherein the signaling also indicates that the transmission of the third data has been modified.

Example 34

The method of Example 3, wherein the signaling indicates that the first transmission has been modified by at least one of: (i) puncturing at least some of the first data, (ii) reducing power allocated to transmission of at least some of the first data, and (iii) modifying rate matching for at least some of the first data.

Example 35

The method of any one of Examples 1 to 35, wherein the signaling is sent at a location in an interval, and the signaling indicates puncturing of the first transmission during at least some of the interval.

Example 36

The method of Example 35, wherein the signaling is sent at the end of the interval.

Example 37

The method of any one of Examples 1 to 36, wherein the first resources comprise time-frequency resources.

Example 38

The method of any one of Examples 1 to 37, wherein the signaling is dynamic signaling.

Example 39

The method of any one of Examples 1 to 38, wherein the signaling is unicast signaling for the first UE.

Example 40

The method of any one of Examples 1 to 39, wherein the signaling is transmitted using a physical downlink control channel (PDCCH).

Example 41

The method of any one of Examples 1 to 40, comprising modifying the scheduling of the first transmission on the portion of the first resources on which the second data is transmitted.

Example 42

The method of Example 14, wherein the signaling in the particular subframe of the plurality of low latency subframes indicates puncturing during at least one other subframe of the plurality of low latency subframes.

Example 43

The method of any one of Examples 1 to 42, wherein the signaling is part of the second data.

Example 44

The method of Example 42, wherein the signaling is an indicator sequence.

Example 45

The method of any one of Examples 1 to 44, wherein the first transmission is scheduled on a scheduling interval, and wherein the signaling is located at or near the end of the scheduling interval.

Example 46

The method of Example 45, wherein the first UE is a latency tolerant UE, and the scheduling interval is a latency tolerant scheduling interval.

Example 47

The method of Example 1, wherein the first resources are part of a low latency resource region, and wherein the low latency region changes dynamically or semi-statically over time.

Example 48

The method of Example 47, wherein the first UE is a latency tolerant UE, wherein the second UE is a low latency UE, and wherein the method further comprises: transmitting signaling to the latency tolerant UE that indicates the low latency resource region.

Example 49

The method of Example 48, wherein the signaling that indicates the low latency resource region is dynamic signaling or semi-static signaling.

Example 50

A method performed by a base station comprising signaling to a latency tolerant UE that a latency tolerant data transmission for the latency tolerant UE has been modified on particular time-frequency resources.

Example 51

The method of Example 50, further comprising transmitting low latency data on the particular time-frequency resources.

Example 52

The method of Example 50 or 51, wherein the particular resources are present in a low latency subframe and the signaling is transmitted in the low latency subframe.

Example 53

The method of any one of Examples 50 to 52, wherein the signaling is sent to a plurality of latency tolerant UEs.

Example 54

The method of any one of Examples 50 to 53, wherein the latency tolerant data transmission is sent over a time interval, and wherein the signaling is sent at or near the end of the time interval.

Example 55

The method of any one of Examples 50 to 54, wherein the latency tolerant data transmission is sent over a plurality of low latency subframes, and wherein the signaling is sent in a last low latency subframe of the plurality of low latency subframes.

Example 56

The method of any one of Examples 1 to 49, wherein the first transmission is scheduled over a plurality of low latency time intervals, and the method further comprising indicating, in a physical downlink control channel, the number of low latency time intervals over which the first transmission is scheduled.

Example 57

The method of Example 56, wherein a low latency time interval is a low latency subframe.

Example 58

The method of any one of Examples 1 to 49, wherein the signaling comprises a bitmap structure that indicates modification of the first transmission on particular resources in the time and/or frequency domain.

Example 59

The method of Example 58, wherein the modification is puncturing.

Example 60

The method of Example 59, wherein the bitmap indicates that a top half of a time-frequency resource partition has been punctured.

Example 61

The method of Example 58, wherein the modification is transmission power reduction.

Example 62

A base station comprising: a scheduler to schedule a first transmission of first data to a first UE on first resources; an antenna to transmit second data to a second UE on a portion of the first resources; a signaling generator to generate signaling to be sent to the first UE, the signaling indicating that the first transmission has been modified.

Example 63

A method performed by a UE, the method comprising: receiving data, from a base station, using resources; concurrently with receiving the data, receiving signaling that indicates that transmission of the data has been modified by the base station; and modifying decoding of the data based on the signaling.

Example 64

The method of Example 63, wherein the UE is a latency tolerant UE, wherein the data is latency tolerant data, and the method further comprising: monitoring for the signaling when the latency tolerant data is scheduled on resources that are also used for low latency data.

Example 65

The method of Example 64, wherein the monitoring occurs every low latency interval.

Example 66

The method of Example 64, wherein the monitoring occurs every group of low latency intervals, and wherein a duration of the group of low latency intervals is less or equal to a latency tolerant interval.

Example 67

The method of Example 66, wherein a latency tolerant interval is a latency tolerant scheduling interval.

Example 68

The method of any one of Examples 65 to 67, wherein a low latency interval is a low latency subframe.

Example 69

The method of any one of Examples 63 to 68, further comprising receiving the signaling at a time-frequency location in a time interval.

Example 70

The method of Example 69, wherein the location is at the end of the time interval.

Example 71

The method of any one of Examples 63 to 70, wherein the signaling that indicates that the transmission of the data has been modified is signaling that indicates puncturing of at least some of the data.

Example 72

The method of any one of Examples 63 to 71 further comprising requesting a HARQ retransmission when received data is insufficient to decode the transmission.

Example 73

A UE comprising: an antenna to receive data, from a base station, using resources; a signaling extractor to extract received signaling that indicates that transmission of the data has been modified by the base station; and a decoder to decode the data based on the signaling.

Example 74

A method for wireless communication, comprising: transmitting, to a first UE, a scheduled first downlink data transmission in first downlink resources; and transmitting signaling, to the first UE, the signaling indicating that a portion of the first downlink transmission in a portion of the first downlink resources has been punctured.

Example 75

The method of Example 74, further comprising: transmitting, to a second UE, a second downlink transmission in the portion of the first downlink resources.

Example 76

The method of Example 75, wherein the second downlink transmission has a different subcarrier spacing from the first downlink transmission.

Example 77

The method of Example 76, wherein the second downlink transmission has a larger subcarrier spacing than the first downlink transmission.

Example 78

The method of any one of Examples 74 to 77, wherein the signaling indicates the portion of the first downlink resources in which the first downlink data transmission has been punctured.

Example 79

The method of any one of Examples 74 to 78, wherein the signaling is dynamic signaling.

Example 80

The method of any one of Examples 74 to 79, wherein: transmitting the signaling comprises transmitting the signaling to multiple UEs including the first UE.

Example 81

A base station comprising: a scheduler to schedule, for a first UE, a first downlink data transmission in first downlink resources; and a signaling generator to generate signaling to be transmitted to the first UE, the signaling indicating that a portion of the first downlink transmission in a portion of the first downlink resources has been punctured.

Example 82

The base station of Example 81, wherein: the scheduler is to schedule, for a second UE, a second downlink transmission in the portion of the first downlink resources.

Example 83

The base station of Example 82, wherein the second downlink transmission has a different subcarrier spacing from the first downlink transmission.

Example 84

The base station of Example 83, wherein the second downlink transmission has a larger subcarrier spacing than the first downlink transmission.

Example 85

The base station of any one of Examples 81 to 84, wherein the signaling indicates the portion of the first downlink resources in which the first downlink data transmission has been punctured.

Example 86

The base station of any one of Examples 81 to 85, wherein the signaling is dynamic signaling.

Example 87

The base station of any one of Examples 81 to 86, wherein the signaling is to be transmitted to multiple UEs including the first UE.

Example 88

A method for wireless communication, comprising: receiving, by a UE, a scheduled first downlink data transmission in first downlink resources; and receiving, by the UE, signaling indicating that a portion of the first downlink transmission in a portion of the first downlink resources has been punctured.

Example 89

The method of Example 88, wherein the signaling indicates the portion of the first downlink resources in which the first downlink data transmission has been punctured.

Example 90

The method of Example 88 or 89, further comprising decoding the first downlink data transmission without attempting to decode the data received in the portion of the first downlink resources.

Example 91

The method of any one of Examples 88 to 90, wherein the signaling is dynamic signaling.

Example 92

A UE comprising: a receiver to receive a scheduled first downlink data transmission in first downlink resources, and to receive signaling indicating that a portion of the first downlink transmission in a portion of the first downlink resources has been punctured; a decoder to attempt to decode at least some of the first downlink data transmission.

Example 93

The UE of Example 92, wherein the signaling indicates the portion of the first downlink resources in which the first downlink data transmission has been punctured.

Example 94

The UE of Example 92 or 93, wherein the decoder is to decode the first downlink data transmission without attempting to decode the data received in the portion of the first downlink resources.

Example 95

The UE of any one of Examples 92 to 94, wherein the signaling is dynamic signaling.

Example 96

A method performed by a base station, the method comprising: transmitting data for a UE using resources; modifying the transmission of the data during the transmission of the data; transmitting signaling that indicates that the transmission of the data has been modified.

Example 97

The method of Example 96, wherein the resources are reserved for the transmission of other data to other UEs that have a lower latency requirement.

Example 98

The method of Example 96 or Example 97, wherein: the signaling indicates how the transmission of the data has been modified; and the signaling is transmitted using the resources.

Example 99

The method of Example 98, wherein: the transmission of the data occurs during a time interval that includes a plurality of low latency subframes; and the signaling is transmitted in a first OFDM symbol of one of the low latency subframes.

Example 100

The method of Example 99, further comprising: during one of the plurality of low latency subframes the base station receiving information indicating that at least one of: a number of other UEs having a lower latency requirement and served by the base station has increased, and new data has arrived to be transmitted to one or more of the other UEs; and wherein the modifying the transmission of the data occurs in response to receipt of the information.

Example 101

The method of any one of Examples 96 to 100, wherein modifying the transmission of the data comprises at least one of: puncturing some of the data, and reducing power allocated to transmission of the data.

Example 102

The method of any one of Examples 96 to 101, wherein the signaling is dedicated to the UE, and wherein transmitting the signaling comprises sending a unicast transmission of the signaling to the UE.

Example 103

The method of any one of Examples 96 to 101, wherein the data is first data and the UE is a first UE, and the method further comprising: transmitting second data for a second UE using the resources; and additionally modifying the transmission of the second data during the transmission of the second data; and wherein the signaling also indicates that the second data transmission has been modified, and wherein transmitting the signaling comprises broadcasting the signaling to the first UE and the second UE.

Example 104

The method of Example 97, wherein the data is first data, and wherein: the first data is transmitted using both time/frequency resources reserved for new data transmissions for the other UEs and time/frequency resources reserved for data retransmissions for the other UEs; and the signaling only indicates a modification of the first data transmission on the time/frequency resources reserved for the data retransmissions.

Example 105

The method of Example 99 or Example 100, wherein the signaling is to be combined with at least one previous signaling in at least one previous low latency subframe in order to determine how the transmission of the data has been modified.

Example 106

The method of Example 98, wherein: the transmission of the data occurs during a time interval that includes a plurality of low latency subframes; and the signaling is transmitted in an OFDM symbol in the last low latency subframe of the time interval.

Example 107

A base station comprising: at least one antenna to transmit data for a UE using resources; a transmission modifier to modify the transmission of the data during the transmission of the data; a signaling generator to generate signaling that indicates that the transmission of the data has been modified.

Example 108

A method performed by a UE, the method comprising: receiving data, from a base station, using resources; during the receiving the data, receiving signaling that indicates that transmission of the data has been modified by the base station.

Example 109

The method of Example 108, wherein the resources are reserved for the receipt of other data by other UEs that have a lower latency requirement.

Example 110

The method of Example 108 or Example 109, wherein: the signaling indicates how the transmission of the data has been modified by the base station; and the signaling is received using the resources.

Example 111

The method of Example 110, wherein: the receiving the data occurs during a time interval that includes a plurality of low latency subframes; and the signaling is received in a first OFDM symbol of one of the low latency subframes.

Example 112

The method of Example 110 or Example 111, further comprising: upon receiving the signaling, modifying the decoding of the data based on an indication in the signaling indicating how the transmission of the data has been modified by the base station.

Example 113

The method of any one of Examples 110 to 112, wherein the signaling indicates that the transmission of the data has been modified due to the base station at least one of: puncturing some of the data, and reducing power allocated to transmission of the data.

Example 114

The method of any one of Examples 108 to 113, wherein the signaling is dedicated to the UE, and wherein receiving the signaling comprises receiving a unicast transmission of the signaling.

Example 115

The method of any one of Examples 108 to 113, wherein the UE is a first UE, and wherein the signaling also indicates that another data transmission for a second UE has been modified, and wherein receiving the signaling comprises receiving a broadcast transmission of the signaling.

Example 116

The method of Example 109, wherein the data is first data and wherein: the first data is received using both time/frequency resources reserved for new data transmissions for the other UEs and time/frequency resources reserved for data retransmissions for the other UEs; and the signaling only indicates a modification of the first data transmission on the time/frequency resources reserved for the data retransmissions.

Example 117

The method of Example 111, further comprising combining the signaling with at least one previous signaling in at least one previous low latency subframe in order to determine how the data transmission has been modified.

Example 118

The method of Example 110, wherein: the receiving the data occurs during a time interval that includes a plurality of low latency subframes; and the signaling is received in an OFDM symbol of the last low latency subframe in the time interval.

Example 119

A UE comprising: at least one antenna to: receive data, from a base station, using resources; and during the receipt of the data, receive signaling that indicates that transmission of the data has been modified by the base station.

Example 120

A method performed by a base station, the method comprising: scheduling a first transmission of first data to a first UE on first resources; transmitting second data to a second UE on a portion of the first resources; signaling to the first UE that the first transmission has been modified.

Example 121

A base station comprising: a scheduler to schedule a first transmission of first data to a first UE on first resources; an antenna to transmit second data to a second UE on a portion of the first resources; a signaling generator to generate signaling to be sent to the first UE, the signaling indicating that the first transmission has been modified.

Example 122

A method performed by a UE, the method comprising: receiving data, from a base station, using resources; concurrently with receiving the data, receiving signaling that indicates that transmission of the data has been modified by the base station; and modifying decoding of the data based on the signaling.

Example 123

A UE comprising: an antenna to receive data, from a base station, using resources; a signaling extractor to extract received signaling that indicates that transmission of the data has been modified by the base station; and a decoder to decode the data based on the signaling.

Example 124

A method performed by a UE, the method comprising: receiving a downlink transmission, from a base station, in downlink resources; receiving signaling, the signaling also sent to at least one other UE, and the signaling indicating that data on a portion of the downlink resources has been punctured; and modifying decoding of the downlink transmission based on the signaling.

Example 125

The method of Example 124, further comprising semi-statically receiving control information indicating a time-frequency location of the downlink resources.

Example 126

The method of Example 124 or 125, further comprising requesting a HARQ retransmission when received data is insufficient to decode the downlink transmission.

Example 127

The method of any one of Examples 124 to 126, further comprising decoding the downlink transmission without attempting to decode the data received in the portion of the downlink resources that has been punctured.

Example 128

The method of any one of Examples 124 to 127, wherein the downlink transmission is a downlink transmission of latency tolerant data, and the method further comprises monitoring for the signaling when the latency tolerant data is scheduled on the downlink resources and the downlink resources can also be used for low latency data.

Example 129

The method of Example 128, wherein the monitoring occurs every low latency interval.

Example 130

The method of Example 128, wherein the monitoring occurs every group of low latency intervals, and wherein a duration of the group of low latency intervals is less than or equal to a latency tolerant interval.

Example 131

The method of Example 130, wherein the latency tolerant interval is a latency tolerant scheduling interval, and wherein a low latency interval is a low latency subframe.

Example 132

A UE comprising: a receiver to receive a downlink transmission, from a base station, in downlink resources, and to receive signaling, the signaling also sent to at least one other UE, and the signaling indicating that data on a portion of the downlink resources has been punctured; and a decoder to modify decoding of the downlink transmission based on the signaling.

Example 133

The UE of Example 132, wherein the receiver is further to semi-statically receive control information indicating a time-frequency location of the downlink resources.

Example 134

The UE of Example 132 or 133, wherein the decoder is to request a HARQ retransmission when received data is insufficient to decode the downlink transmission.

Example 135

The UE of any one of Examples 132 to 134, wherein the decoder is to decode the downlink transmission without attempting to decode the data received in the portion of the downlink resources that has been punctured.

Example 136

The UE of any one of Examples 132 to 135, wherein the downlink transmission is a downlink transmission of latency tolerant data, and the receiver is to monitor for the signaling when the latency tolerant data is scheduled on the downlink resources and the downlink resources can also be used for low latency data.

Example 137

The UE of Example 136, wherein the monitoring is to occur every low latency interval.

Example 138

The UE of Example 136, wherein the monitoring is to occur every group of low latency intervals, and wherein a duration of the group of low latency intervals is less than or equal to a latency tolerant interval.

Example 139

The UE of Example 138, wherein the latency tolerant interval is a latency tolerant scheduling interval, and wherein a low latency interval is a low latency subframe.

Example 140

A method for wireless communication, comprising: transmitting, to a first UE, a scheduled first downlink transmission in first downlink resources; transmitting, to a second UE, a scheduled second downlink transmission in the first downlink resources; transmitting, to a third UE, a scheduled third downlink transmission in second downlink resources different from the first downlink resources; transmitting a common signaling to the first UE and to the second UE, but not to the third UE, the common signaling indicating that a portion of at least one of the first downlink transmission and the second downlink transmission has been punctured; transmitting, to a fourth UE, a fourth downlink transmission in the portion of the at least one of the first downlink transmission and the second downlink transmission that has been punctured.

Example 141

The method of Example 140, further comprising semi-statically transmitting control information indicating a time-frequency location of the first downlink resources.

Example 142

The method of Example 140, further comprising dynamically transmitting control information indicating a time-frequency location of the first downlink resources.

Example 143

The method of any one of Examples 140 to 142, wherein the fourth downlink transmission has a different subcarrier spacing from each of the first downlink transmission, the second downlink transmission, and the third downlink transmission.

Example 144

The method of any one of Examples 140 to 143, wherein the fourth downlink transmission has a lower latency requirement than each of the first downlink transmission, the second downlink transmission, and the third downlink transmission.

Example 145

The method of any one of Examples 140 to 144, wherein the common signaling indicates a time-frequency location of the portion of the at least one of the first downlink transmission and the second downlink transmission that has been punctured.

Example 146

A base station comprising: a scheduler to schedule, for a first UE, a first downlink transmission in first downlink resources; the scheduler to schedule, for a second UE, a second downlink transmission in the first downlink resources; the scheduler to schedule, for a third UE, a third downlink transmission in second downlink resources different from the first downlink resources; a signaling generator to generate common signaling for the first UE and the second UE, but not for the third UE, the common signaling indicating that a portion of at least one of the first downlink transmission and the second downlink transmission has been punctured; the scheduler to schedule, for a fourth UE, a fourth downlink transmission in the portion of the at least one of the first downlink transmission and the second downlink transmission that has been punctured.

Example 147

The base station of Example 146, wherein the base station is to semi-statically transmit control information indicating a time-frequency location of the first downlink resources.

Example 148

The base station of Example 146, wherein the base station is to dynamically transmit control information indicating a time-frequency location of the first downlink resources.

Example 149

The base station of any one of Examples 146 to 148, wherein the fourth downlink transmission has a different subcarrier spacing from each of the first downlink transmission, the second downlink transmission, and the third downlink transmission.

Example 150

The base station of any one of Examples 146 to 149, wherein the fourth downlink transmission has a lower latency requirement than each of the first downlink transmission, the second downlink transmission, and the third downlink transmission.

Example 151

The base station of any one of Examples 146 to 150, wherein the common signaling indicates a time-frequency location of the portion of the at least one of the first downlink transmission and the second downlink transmission that has been punctured.

Example 1A

A method performed by a user equipment (UE), the method comprising:
receiving a downlink transmission, from a base station, in first downlink resources;
receiving signaling, the signaling also sent to at least one other UE, and the signaling indicating that data on a portion of the first downlink resources has been punctured; and
modifying decoding of the downlink transmission based on the signaling.

Example 2A

The method of Example 1A, further comprising semi-statically receiving control information indicating a time-frequency location of the first downlink resources.

Example 3A

The method of Example 1A, further comprising requesting a hybrid automatic repeat request (HARQ) retransmission when received data is insufficient to decode the downlink transmission.

Example 4A

The method of Example 1A, wherein modifying decoding of the downlink transmission comprises ignoring bits of the data received on the portion of the first downlink resources that has been punctured.

Example 5A

The method of Example 1A, wherein the downlink transmission is a downlink transmission of latency tolerant data, and the method further comprises monitoring for the signaling when the latency tolerant data is scheduled on the first downlink resources and the first downlink resources can also be used for low latency data.

Example 6A

The method of Example 5A, wherein the monitoring occurs every low latency interval.

Example 7A

The method of Example 5A, wherein the monitoring occurs every group of low latency intervals.

Example 8A

The method of Example 7A, wherein the monitoring occurs at the end of a group of low latency intervals.

Example 9A

The method of Example 7A, wherein a duration of the group of low latency intervals is less than or equal to a latency tolerant interval, wherein the latency tolerant interval is a latency tolerant scheduling interval, and wherein a low latency interval is a low latency subframe.

Example 10A

A user equipment (UE) comprising:
a receiver to receive a downlink transmission, from a base station, in first downlink resources, and to receive signaling, the signaling also sent to at least one other UE, and the signaling indicating that data on a portion of the first downlink resources has been punctured; and
a decoder to modify decoding of the downlink transmission based on the signaling.

Example 11A

The UE of Example 10A, wherein the receiver is further to semi-statically receive control information indicating a time-frequency location of the first downlink resources.

Example 12A

The UE of Example 10A, wherein the decoder is to request a hybrid automatic repeat request (HARQ) retransmission when received data is insufficient to decode the downlink transmission.

Example 13A

The UE of Example 10A, wherein the decoder is to modify decoding of the downlink transmission by ignoring bits of the data received on the portion of the first downlink resources that has been punctured.

Example 14A

The UE of Example 10A, wherein the downlink transmission is a downlink transmission of latency tolerant data, and the receiver is to monitor for the signaling when the latency tolerant data is scheduled on the first downlink resources and the first downlink resources can also be used for low latency data.

Example 15A

The UE of Example 14A, wherein the monitoring is to occur every low latency interval.

Example 16A

The UE of Example 14A, wherein the monitoring is to occur every group of low latency intervals.

Example 17A

The UE of Example 16A wherein the monitoring occurs at the end of a group of low latency intervals.

Example 18A

The UE of Example 16A, wherein a duration of the group of low latency intervals is less than or equal to a latency tolerant interval, wherein the latency tolerant interval is a latency tolerant scheduling interval, and wherein a low latency interval is a low latency subframe.

Example 19A

A method for wireless communication, comprising:
transmitting, to a first user equipment (UE), a scheduled first downlink transmission in first downlink resources;
transmitting, to a second UE, a scheduled second downlink transmission in the first downlink resources;
transmitting, to a third UE, a scheduled third downlink transmission in second downlink resources different from the first downlink resources;
transmitting a common signaling to the first UE and to the second UE, but not to the third UE, the common signaling indicating that a portion of at least one of the first downlink transmission and the second downlink transmission has been punctured;
transmitting, to a fourth UE, a fourth downlink transmission in the portion of the at least one of the first downlink transmission and the second downlink transmission that has been punctured.

Example 20A

The method of Example 19A, further comprising semi-statically transmitting control information indicating a time-frequency location of the first downlink resources.

Example 21A

The method of Example 19A further comprising dynamically transmitting control information indicating a time-frequency location of the first downlink resources.

Example 22A

The method of Example 19A, wherein the fourth downlink transmission has a different subcarrier spacing from at least one of the first downlink transmission, the second downlink transmission, and the third downlink transmission.

Example 23A

The method of Example 19A, wherein the fourth downlink transmission has a lower latency requirement than each of the first downlink transmission, the second downlink transmission, and the third downlink transmission.

Example 24A

The method of Example 19A, wherein the common signaling indicates a time-frequency location of the portion of the first downlink resources that have been punctured.

Example 25A

The method of Example 24A, wherein the common signaling comprises a bitmap.

Example 26A

The method of Example 25A, wherein the bitmap contains a plurality of bits, each bit of the plurality of bits corresponding to a respective low latency subframe and indicating whether the respective low latency subframe has been punctured.

Example 27A

The method of Example 24A, wherein the common signaling indicates a respective value for each of a plurality of low latency subframes, the value indicating what portion of the subframe has been punctured.

Example 28A

The method of Example 27A, wherein the value is represented by a plurality of bits.

Example 29A

A base station comprising:
a scheduler to schedule, for a first user equipment (UE), a first downlink transmission in first downlink resources;
the scheduler to schedule, for a second UE, a second downlink transmission in the first downlink resources;
the scheduler to schedule, for a third UE, a third downlink transmission in second downlink resources different from the first downlink resources;
a signaling generator to generate common signaling for the first UE and the second UE, but not for the third UE, the common signaling indicating that a portion of at least one of the first downlink transmission and the second downlink transmission has been punctured;
the scheduler to schedule, for a fourth UE, a fourth downlink transmission in the portion of the at least one of the first downlink transmission and the second downlink transmission that has been punctured.

Example 30A

The base station of Example 29A, wherein the base station is to semi-statically transmit control information indicating a time-frequency location of the first downlink resources.

Example 31A

The base station of Example 29A, wherein the base station is to dynamically transmit control information indicating a time-frequency location of the first downlink resources.

Example 32A

The base station of Example 29A, wherein the fourth downlink transmission has a different subcarrier spacing from at least one of the first downlink transmission, the second downlink transmission, and the third downlink transmission.

Example 33A

The base station of Example 29A, wherein the fourth downlink transmission has a lower latency requirement than each of the first downlink transmission, the second downlink transmission, and the third downlink transmission.

Example 34A

The base station of Example 29A, wherein the common signaling indicates a time-frequency location of the portion of the at least one of the first downlink transmission and the second downlink transmission that has been punctured.

Example 35A

The base station of Example 29A, wherein the common signaling indicates a time-frequency location of the portion of the first downlink resources that have been punctured.

Example 36A

The base station of Example 35A, wherein the common signaling comprises a bitmap.

Example 37A

The base station of Example 36A, wherein the bitmap contains a plurality of bits, each bit of the plurality of bits corresponding to a respective low latency subframe and indicating whether the respective low latency subframe has been punctured.

Example 38A

The base station of Example 35A, wherein the common signaling indicates a respective value for each of a plurality of low latency subframes, the value indicating what portion of the subframe has been punctured.

Example 39A

The base station of Example 38, wherein the value is represented by a plurality of bits.

CONCLUSION

Although the present invention has been described with reference to specific features and embodiments thereof, various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although the present invention and its advantages have been described in detail, various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, any module, component, or device exemplified herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor readable storage media.

The invention claimed is:

1. A method performed by a user equipment (UE), the method comprising:
   receiving, by the UE, a downlink transmission from a base station, in first downlink resources;
   receiving, by the UE, broadcast or group-common control signaling including an indication that a portion of the first downlink resources has been punctured;
   determining, by the UE, that a portion of the downlink transmission has been punctured, based on the broadcast or group-common control signaling; and
   decoding the downlink transmission based on the determination.

2. The method of claim 1, further comprising semi-statically receiving control information indicating a time-frequency location of the first downlink resources.

3. The method of claim 1, further comprising requesting a hybrid automatic repeat request (HARQ) retransmission upon determining that data received over the first downlink resources is insufficient to decode the downlink transmission.

4. The method of claim 1, wherein decoding the downlink transmission comprises ignoring bits of data received on the portion of the first downlink resources that has been punctured.

5. The method of claim 1, wherein the downlink transmission carries latency tolerant data, and the method further comprises monitoring a channel for the broadcast or group-common control signaling upon determining that the latency tolerant data is scheduled over the first downlink resources and the first downlink resources are available for low latency data transmissions.

6. The method of claim 5, wherein the monitoring occurs every low latency interval.

7. The method of claim 5, wherein the monitoring occurs every group of low latency intervals.

8. The method of claim 7, wherein the monitoring occurs at an end of a group of low latency intervals.

9. The method of claim 7, wherein a duration of a group of low latency intervals is less than or equal to a latency tolerant interval, wherein the latency tolerant interval is a latency tolerant scheduling interval, and wherein a low latency interval is a low latency subframe.

10. A user equipment (UE) comprising:
    a receiver configured to receive a downlink transmission, from a base station, over first downlink resources, and to receive broadcast or group-common control signaling including an indication that a portion of the first downlink resources has been punctured;
    a processor configured to determine that a portion of the downlink transmission has been punctured, based on the broadcast or group-common control signaling; and
    a decoder configured to decode the downlink transmission based on determination of the processor.

11. The UE of claim 10, wherein the receiver is further configured to semi-statically receive control information indicating a time-frequency location of the first downlink resources.

12. The UE of claim 10, wherein the decoder is further configured to request a hybrid automatic repeat request (HARQ) retransmission upon determining that data received over the first downlink resources is insufficient to decode the downlink transmission.

13. The UE of claim 10, wherein the decoder is configured to decode the downlink transmission by ignoring bits of data received on the portion of the first downlink resources that has been punctured.

14. The UE of claim 10, wherein the downlink transmission carries latency tolerant data, and the receiver is configured for monitoring a channel for the broadcast or group-common control signaling upon determining that the latency tolerant data is scheduled over the first downlink resources and the first downlink resources are available for low latency data transmissions.

15. The UE of claim 14, wherein the monitoring is to occur every low latency interval.

16. The UE of claim 14, wherein the monitoring is to occur every group of low latency intervals.

17. The UE of claim 16 wherein the monitoring occurs at an end of a group of low latency intervals.

18. The UE of claim 16, wherein a duration of a group of low latency intervals is less than or equal to a latency tolerant interval, wherein the latency tolerant interval is a latency tolerant scheduling interval, and wherein a low latency interval is a low latency subframe.

* * * * *